US012517450B2

(12) United States Patent
Minagawa

(10) Patent No.: US 12,517,450 B2
(45) Date of Patent: Jan. 6, 2026

(54) IMAGE FORMING APPARATUS

(71) Applicant: CANON KABUSHIKI KAISHA, Tokyo (JP)

(72) Inventor: Taisuke Minagawa, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/660,761

(22) Filed: May 10, 2024

(65) Prior Publication Data

US 2024/0377781 A1 Nov. 14, 2024

(30) Foreign Application Priority Data

May 12, 2023 (JP) ................................ 2023-079732

(51) Int. Cl.
*G03G 15/16* (2006.01)
*G03G 15/00* (2006.01)

(52) U.S. Cl.
CPC ..... *G03G 15/1675* (2013.01); *G03G 15/6594* (2013.01)

(58) Field of Classification Search
CPC ........... G03G 15/1675; G03G 15/1695; G03G 15/6558; G03G 15/6529; G03G 15/6555
See application file for complete search history.

(56) References Cited

U.S. PATENT DOCUMENTS

| | | | | |
|---|---|---|---|---|
| 6,404,998 B1 | 6/2002 | Tanaka et al. | | |
| 2011/0150553 A1* | 6/2011 | Akatsuka | G03G 15/6511 271/10.09 |
| 2015/0185668 A1 | 7/2015 | Matsuzaki | |
| 2017/0315479 A1 | 11/2017 | Sato et al. | |
| 2018/0239288 A1* | 8/2018 | Asami | G03G 15/2021 |
| 2019/0079434 A1 | 3/2019 | Shindo et al. | |

(Continued)

FOREIGN PATENT DOCUMENTS

| | | |
|---|---|---|
| JP | 07-56451 A | 3/1995 |
| JP | 8-227238 A | 9/1996 |

(Continued)

OTHER PUBLICATIONS

Extended European Search Report dated Oct. 28, 2024, in European Patent Application No. 24173010.0.

*Primary Examiner* — Jessica L Eley
(74) *Attorney, Agent, or Firm* — Venable LLP

(57) ABSTRACT

An image forming apparatus includes a rotatable image bearing member, a charging member, a developing member, a transfer member, a transfer voltage applying portion, and a recording material charging member. The recording material charging member is provided on a side upstream of a transfer nip with respect to a conveying direction of a recording material that is nipped and conveyed through the transfer nip and is capable of contacting an image forming surface, which is a surface of the recording material onto which a toner image is transferred, conveyed toward the transfer nip, and capable of charging the image forming surface to the same polarity as a predetermined polarity by triboelectric charge. A contact portion of the recording material charging member that contacts the recording material is movable in a direction crossing a surface of the recording material at a position where the recording material opposes the recording material charging member.

13 Claims, 11 Drawing Sheets

(56) References Cited

U.S. PATENT DOCUMENTS

| | | | | |
|---|---|---|---|---|
| 2021/0002097 | A1* | 1/2021 | Kasuya | G03G 15/6552 |
| 2021/0216031 | A1* | 7/2021 | Tanaka | G03G 15/6535 |
| 2021/0397113 | A1 | 12/2021 | Kakehi et al. | |
| 2023/0092025 | A1 | 3/2023 | Usui et al. | |

FOREIGN PATENT DOCUMENTS

| | | | |
|---|---|---|---|
| JP | 2002-055542 | A | 2/2002 |
| JP | 2010-204235 | A | 9/2010 |
| JP | 2015-125376 | A | 7/2015 |

* cited by examiner (a)

(b)

IMAGE FORMING APPARATUS

FIELD OF THE INVENTION AND RELATED ART

The present invention relates to an image forming apparatus, such as a printer, a copying machine, or a facsimile machine, of an electrophotographic type.

Conventionally, in the image forming apparatus of the electrophotographic type, a surface of a recording material as an image bearing member is electrically charged, and the charged surface of the photosensitive member is exposed to light depending on image information, so that an electrostatic latent image is formed on the photosensitive member. Further, on the electrostatic latent image formed on the photosensitive member, charged toner is deposited, so that a transfer image is formed on the photosensitive member, and the transfer image formed on the photosensitive member is transferred onto a sheet like recording material such as paper. The recording material on which the toner is transferred is separated from the photosensitive member and then is conveyed to a fixing device. As the photosensitive member, a rotatable photosensitive drum is used in many cases. Further, as a transfer member for transferring the transfer image from the photosensitive member onto the recording material, a transfer roller is used in many cases. In the following, an image forming apparatus including the photosensitive drum and the transfer roller will be described as an example. Further, as regards the recording material, a leading end and a trailing end refer to a leading end and a trailing end with respect to a conveying direction of the recording material when the recording material passes through a transfer nip even if not explicitly specified.

The transfer roller contacts the photosensitive drum and forms the transfer nip between itself and the photosensitive drum. Then, to the transfer roller, a transfer voltage of a polarity opposite to a normal charge polarity of the toner is applied, and thus an electric charge is imparted to the recording material nipped and conveyed by the photosensitive drum and the transfer roller in the transfer nip, so that a transfer image on the photosensitive drum is transferred onto the recording material. In such a constitution, when a trailing end of the recording material passes through the transfer nip, peeling discharge occurs between the photosensitive drum and the recording material in some instances. When this peeling discharge occurs, a potential difference occurs between a portion which is affected by the peeling discharge on the photosensitive drum and a portion which is not affected by the peeling discharge on the photosensitive drum. Then, when an image to be transferred onto a subsequent recording material is formed on the photosensitive drum, a phenomenon which is called a "trailing end memory" such that the potential difference on the photosensitive drum cannot be completely canceled by charging processing and appears as a black stripe (stripe density non uniformity extending in a rotational axis direction of the photosensitive drum) occurs in some instances.

Therefore, in Japanese Laid-Open Patent Application No. 2002-55542, a method in which the above-described trailing end memory is suppressed by applying a weak voltage (trailing end voltage) lower than a transfer voltage, applied in an image forming region, in a non-image forming region (margin portion) on a trailing end side of the recording material.

Incidentally, in recent years, an image forming apparatus high in productivity and image quality than ever before tends to be required.

As a means for improving the productivity of the image forming apparatus, there is a case that a conveying speed of the recording material is quickened. In the case, there is a need to transfer in a larger amount per unit time from the photosensitive drum onto the recording material, so that a need to apply a stronger transfer voltage to the transfer roller is liable to arise. In general, it has been known that when a strong voltage is applied to the transfer roller, a charge amount of a non-image forming surface (non-print surface, back surface) of the recording material of a polarity opposite to the normal charge polarity of the toner, i.e., a polarity opposite to a charge polarity of the photosensitive drum, increases, and correspondingly to this, an amount of the above described peeling discharge also increases.

Further, as a means for improving the image quality of the image forming apparatus, there is a case that a transfer charge amount is increased. By increasing the transfer charge amount, transfer with an insufficient charge amount is reduced, so that the toner can be deposited on an electrostatic latent image portion more faithfully. By this, disorder of the transfer image can be reduced, so that a higher image quality can be achieved. In this case, a total electric charge amount of the toner existing on the recording material becomes larger. For that reason, in order to electrostatically hold the transfer image on the recording material, there is a need to charge the non-image forming surface of the recording material to the polarity opposite to the normal charge polarity of the toner, i.e., the polarity opposite to the charge polarity of the photosensitive drum, by applying a stronger transfer voltage to the transfer roller. Also, in this case, a charge amount of the non-image forming surface of the recording material increases, and the above described peeling discharge amount also increases.

Thus, for example, in the case high productivity and high image quality of the image forming apparatus are intended to be realized or in the like case, in a conventional constitution, it becomes difficult to sufficiently suppress the trailing end memory in some instances. For that reason, in place of or for assistance to the conventional method, a method of enabling suppression of the trailing end memory has been required.

SUMMARY OF THE INVENTION

Accordingly, a principal object of the present invention is to provide an image forming apparatus capable of suppressing peeling discharge between an image bearing member and a recording material when a trailing end of the recording material passes through a transfer nip.

According to an aspect of the present invention, there is provided an image forming apparatus comprising: a rotatable image bearing member; a charging member configured to electrically charge a surface of the image bearing member to a predetermined polarity; a developing member configured to form a toner image on the surface of the image bearing member by supplying toner, charged to the same polarity as the predetermined polarity, to the surface of the image bearing member charged by the charging member; a transfer member configured to form a transfer nip in contact with the surface of the image bearing member and configured to transfer the toner image from the image bearing member onto a recording material passing through the transfer nip under application of a transfer voltage; an applying portion configured to apply, to the transfer member, the transfer voltage of a polarity opposite to the predetermined polarity; and a recording material charging member provided on a side upstream of the transfer nip with respect to a conveying direction of the recording material nipped and conveyed through the transfer nip and capable of contacting an image forming surface which is a surface of the recording material, onto which the toner image is transferred, conveyed toward the transfer nip, and capable of charging the image forming surface to the same polarity as the predetermined polarity by triboelectric charge, wherein a contact portion of the recording material charging member with the recording material is movable in a direction crossing the surface of the recording material in a position where the recording material opposes the recording material charging member.

Further features of the present invention will become apparent from the following description of exemplary embodiments with reference to the attached drawings.

Figure 4:
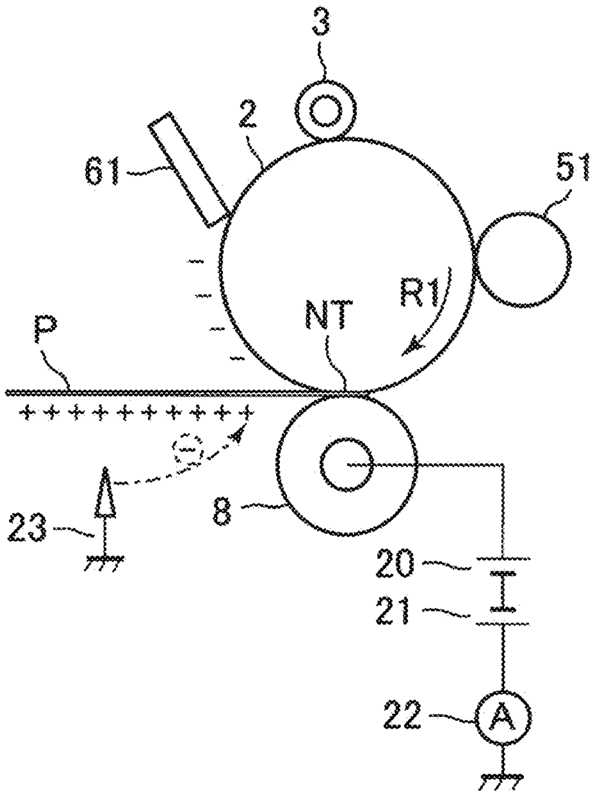
Figure 4:
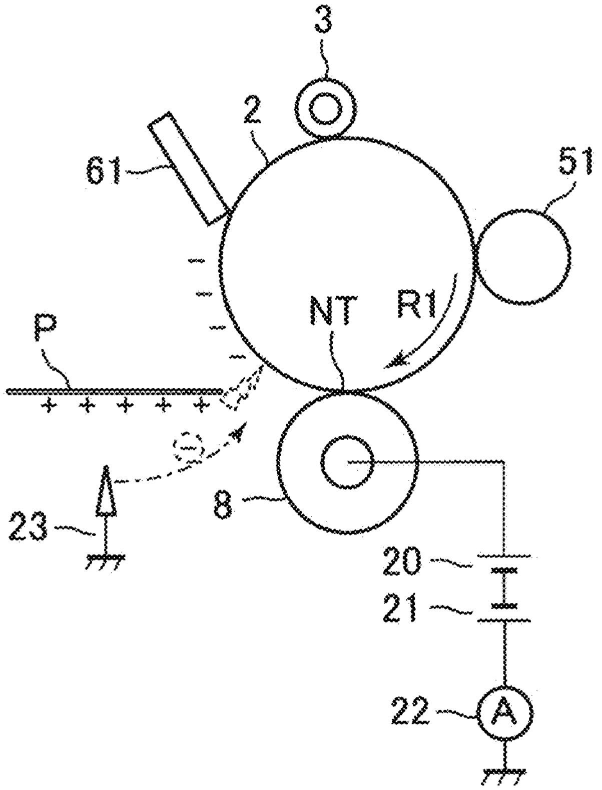

Parts (a) and (b) of FIG. 4 are schematic views for illustrating an occurrence mechanism of a trailing end memory.

Figure 5:
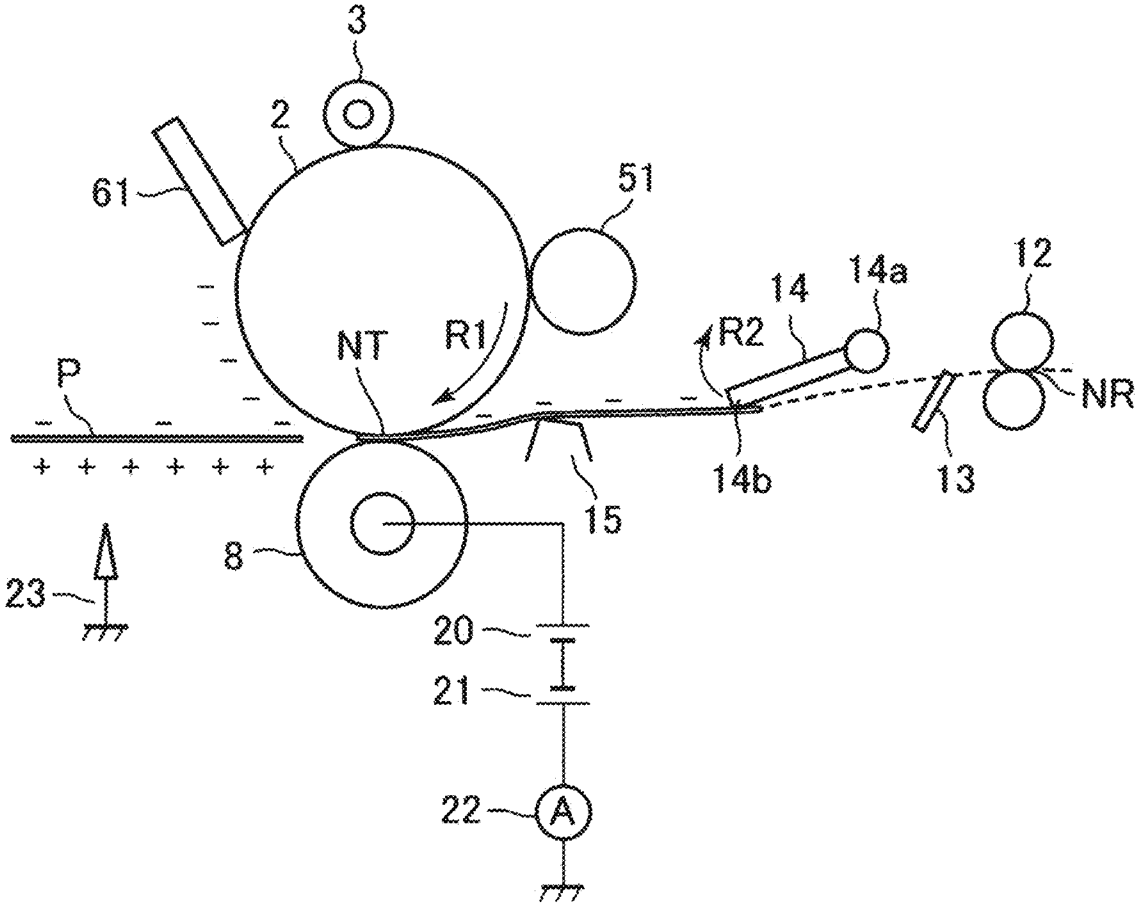

FIG. 5 is a schematic view for illustrating a suppression mechanism of the trailing end memory.

Figure 6:
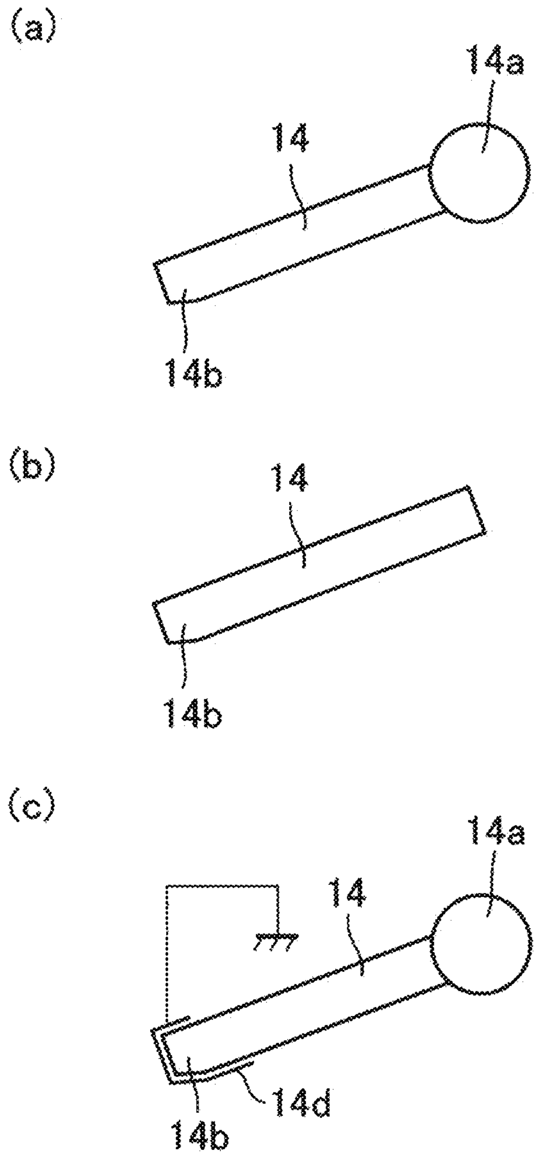

Parts (a) to (c) of FIG. 6 are schematic sectional views showing upper transfer guides in the embodiment 1, a comparison example 1, and a comparison example 2, respectively.

Figure 7:
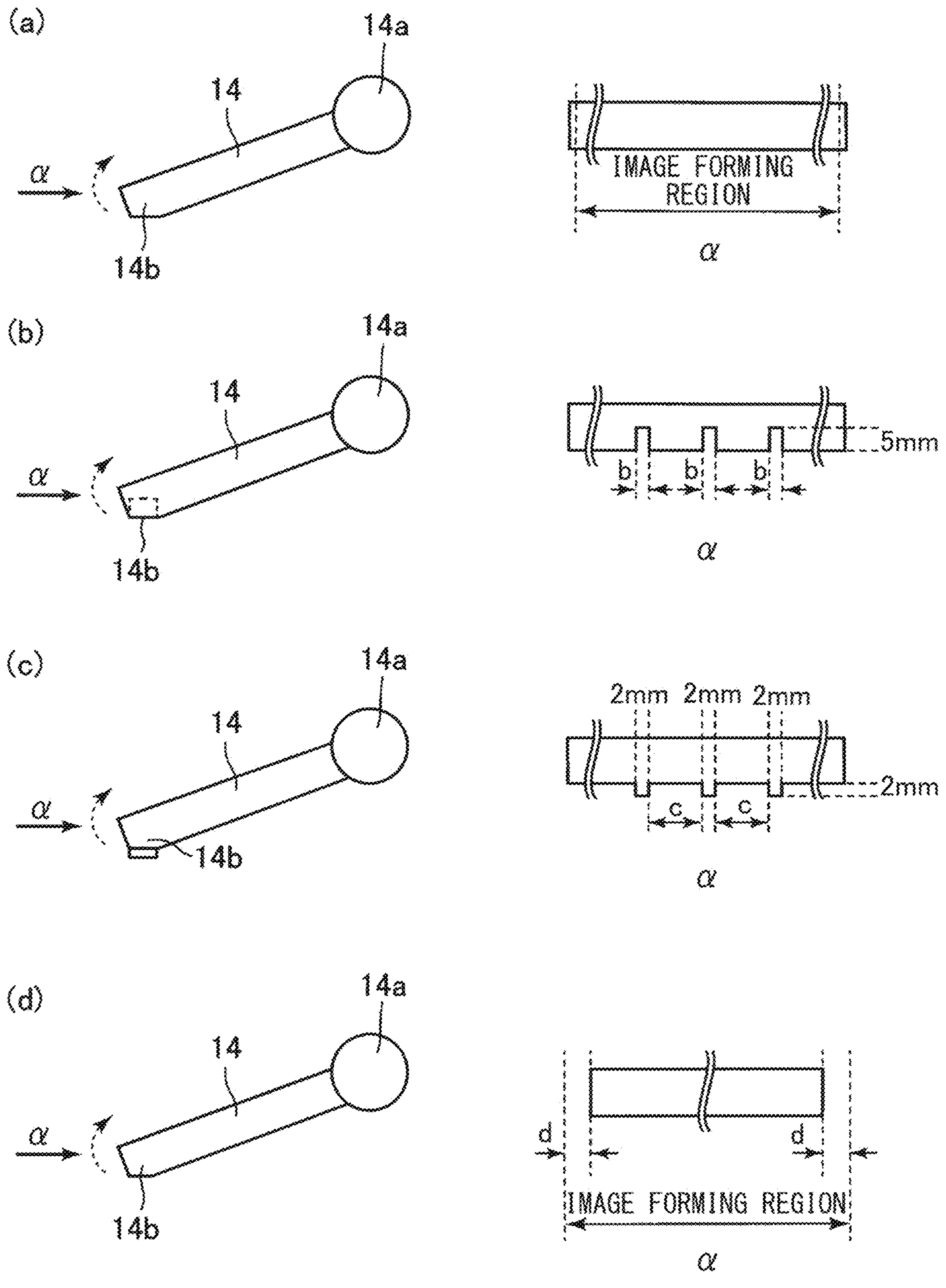

Parts (a) to (d) of FIG. 7 are schematic sectional views each showing an upper transfer guide in a modified embodiment of the embodiment 1.

Figure 8:
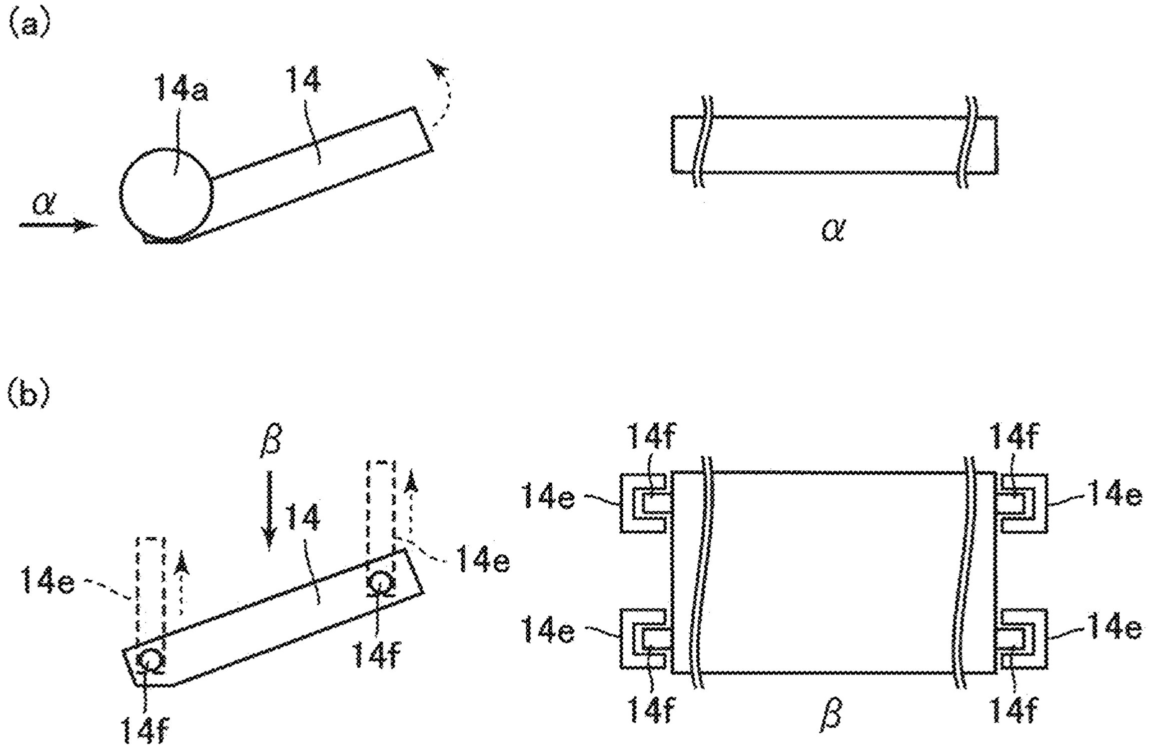

Parts (a) and (b) of FIG. 8 are schematic sectional views each showing an upper transfer guide in another modified embodiment of the embodiment 1.

Figure 9:
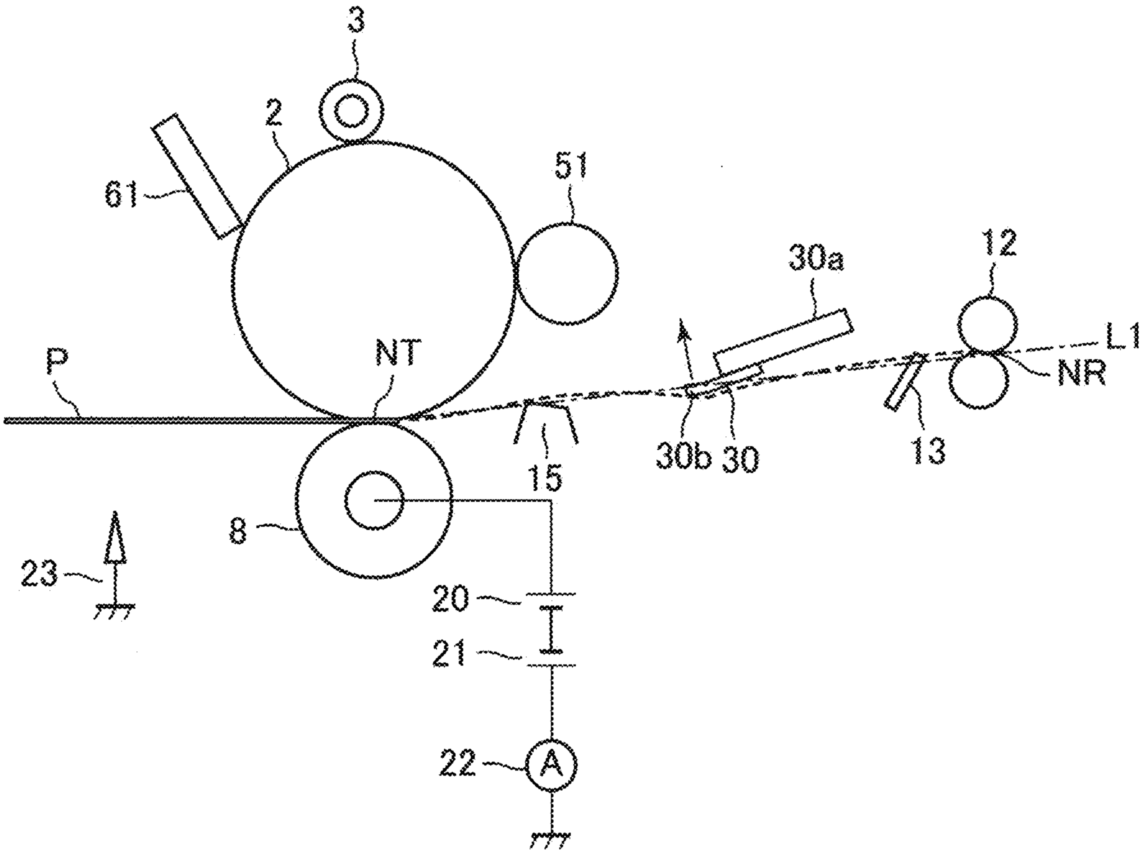

FIG. 9 is a schematic sectional view of a neighborhood of a transfer nip in an image forming apparatus of an embodiment 2.

Figure 10:
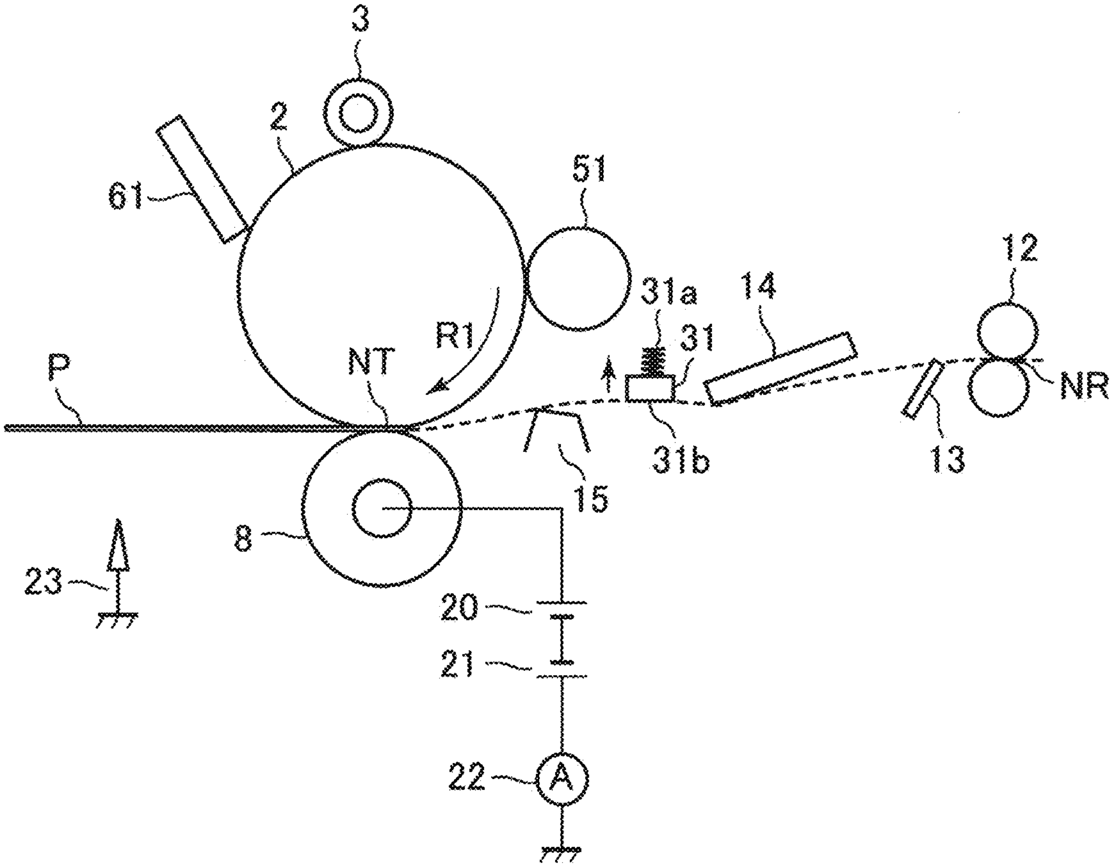

FIG. 10 is a schematic sectional view of a neighborhood of a transfer nip in an image forming apparatus of another embodiment.

Figure 11:
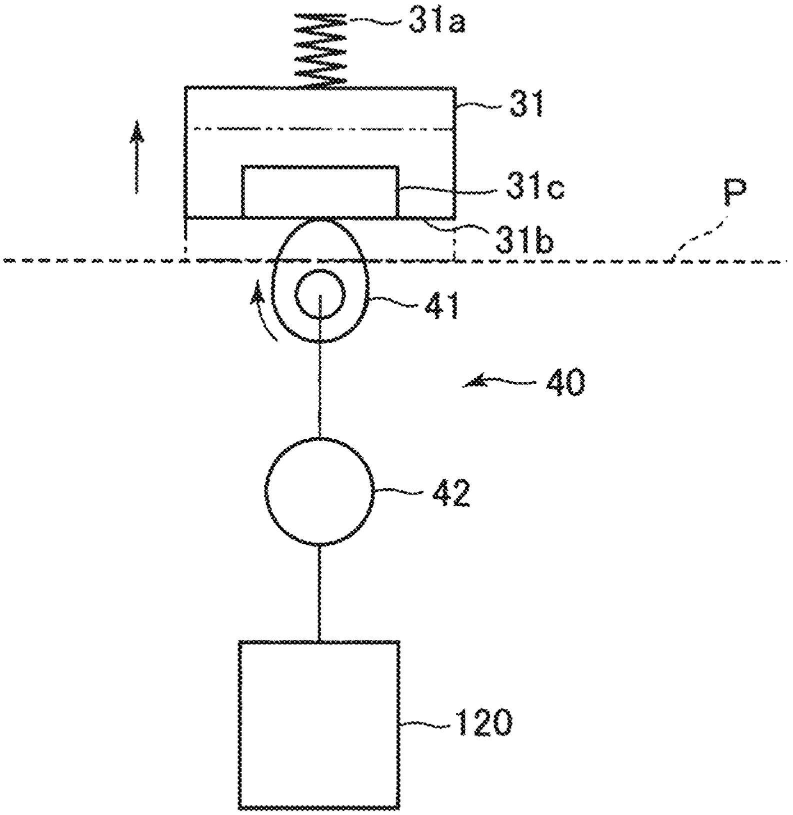

FIG. 11 is a schematic sectional view of a neighborhood of a transfer nip in an image forming apparatus of a further embodiment.

DESCRIPTION OF THE EMBODIMENTS

In the following, an image forming apparatus according to the present invention will be specifically described with reference to the drawings.

(1) Image Forming Apparatus

Figure 1:
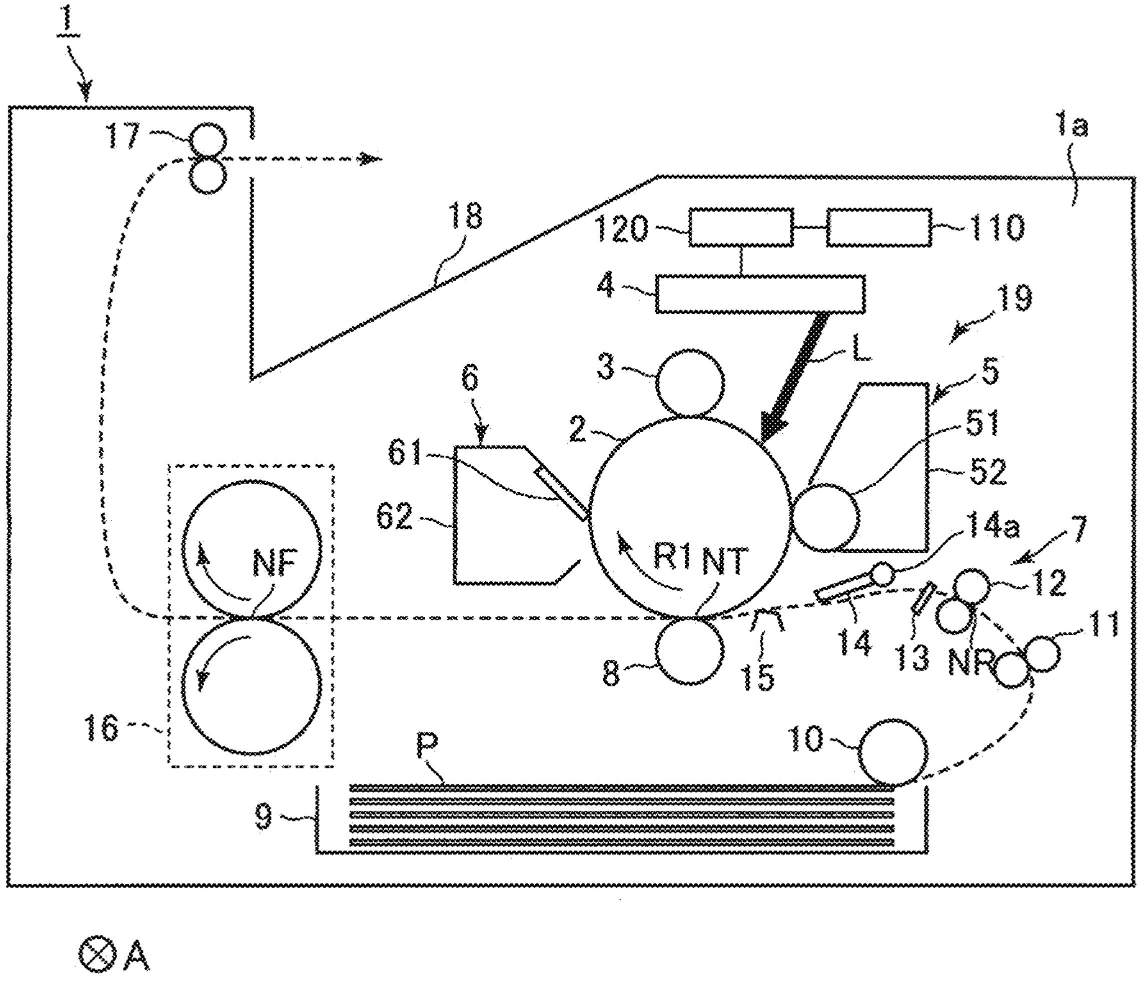
FIG. 1 is a schematic sectional view of an image forming apparatus of an embodiment 1.

First, a general structure of an image forming apparatus 1 of an embodiment 1 will be described. FIG. 1 is a schematic view (showing a cross section substantially perpendicular to a rotational axis direction of a photosensitive drum 2 (described later)) of the image forming apparatus 1 of this embodiment. The image forming apparatus 1 of this embodiment is a monochromatic laser printer of an electrophotographic type and is capable of forming a black (monochromatic) image on a sheet like recording material P depending on image information inputted from an external device (not shown) such as a host computer.

The image forming apparatus 1 includes the photosensitive drum 2 which is a rotatable drum-type (cylindrical) photosensitive member (electrophotographic photosensitive member) as an image bearing member. When a print instruction is inputted from the external device to the image forming apparatus 1, the photosensitive drum 2 is rotationally driven in an arrow R1 direction (clockwise direction) in FIG. 1 at a predetermined peripheral speed (process speed). In this embodiment, the photosensitive drum 2 is an organic photosensitive drum of 30 mm in outer diameter, in which on an aluminum cylinder, an OPC (organic photo-conductor) layer including a 20 mm-thick CT (charge transfer) layer principally comprising a polycarbonate-based binder is formed.

A surface (other peripheral surface) of the photosensitive drum 2 is electrically charged to a predetermined potential with the same polarity (negative polarity in this embodiment) as a normal charge polarity of the toner by a charging roller 3 which is a charging member of a roller type. The charging roller 3 constitutes a charging device as a charging means. In this embodiment, the charging roller 3 is an elastic roller with a single layer structure of an electroconductive elastic layer coated on an electroconductive core metal. The charging roller 3 is disposed so as to contact the surface of the photosensitive drum 2 at the surface (outer peripheral surface), and is pressed toward the photosensitive drum 2 by a pressing means (not shown) at opposite end portions of the electroconductive core metal with respect to a rotational axis direction. The charging roller 3 is rotated with rotation of the photosensitive drum 2. During the charging process, to the charging roller 3, a predetermined charging voltage (charging bias) which is a DC voltage of the same polarity (negative polarity in this embodiment) as the normal charge polarity is applied.

The charged surface of the photosensitive drum 2 is subjected to scanning exposure to light by a laser scanner (exposure device) 4 as an exposure means, so that an electrostatic latent image (electrostatic image) is formed on the photosensitive drum 2. That is, the image information inputted from the external device to the image forming apparatus 1 is converted by a video controller 110 to image forming information for forming an image by the image forming apparatus 1. Thereafter, the laser scanner 4 receives a light emission instruction based on the image forming information from a controller 120, and then outputs laser light L modulated depending on a time-series electric digital pixel signal based on the image forming signal. Then, the laser scanner 4 subjects the charged surface of the photosensitive drum 2 to the scanning exposure to the laser light L. By this, an electrostatic latent image depending on image information is formed on the surface of the photosensitive drum 2.

The electrostatic latent image formed on the photosensitive drum 2 is developed (visualized) by being supplied with toner as a developer by a developing device 5 as a developing means, so that a transfer image (developer image) is formed on the photosensitive drum 2. The developing device 5 includes a developing container 52 in which the toner is accommodated and a developing roller 51 as a developer carrying member rotatably supported by the developing container 52. The developing roller 51 carries the toner in the developing container 52 and conveys the toner to a developing portion which is an opposing portion between the photosensitive drum 2 and the developing roller 51, and thus supplies the toner to the electrostatic latent image on the photosensitive drum 2. In this embodiment, during the development, the developing roller 51 contacts the photosensitive drum 2. Further, during the development, to the developing roller 51, a predetermined developing voltage (developing bias) which is a DC voltage of the same polarity (negative polarity in this embodiment) as the normal charge polarity of the transfer is applied. The developing device 5 deposits the toner, charged to the same polarity (negative polarity in this embodiment) as the charge polarity of the photosensitive drum 2, on an exposed portion (image portion) on the photosensitive drum 2 lowered in absolute value of a potential by being exposed to light after being uniformly charged (reverse development type). In this embodiment, the normal charge polarity of the toner, which is a principal charge polarity of the toner during the development, is negative polarity.

A transfer roller 8 which is a roller-type transfer member as a transfer means is provided opposed to the photosensitive drum 2. The transfer roller 8 is disposed so that a surface (outer peripheral surface) thereof contacts the surface of the photosensitive drum 2, and is pressed toward the photosensitive drum 2, so that a transfer nip (transfer portion) NT is formed between the surface of the photosensitive drum 2 and the surface of the transfer roller 8. The transfer image formed on the photosensitive drum 2 is sent to the transfer nip NT by rotation of the photosensitive drum 2. In this embodiment, an image forming portion 19 is constituted by the photosensitive drum 2, the charging roller 3, the laser scanner 4, the developing device 5, and the like.

A sheet-like recording material (recording medium, transfer material) P such as paper is stacked and accommodated. This recording material P is picked up and fed from a feeding cassette 9 by a feeding roller 10 or the like as a feeding member driven at a predetermined control timing. This recording material P is sent to a registration portion 7 by a conveying roller pair 11 as a conveying member. The registration portion 7 is provided with a registration roller pair 12 as a synchronism conveying member. The recording material P is once received in a registration nip NR formed by the registration roller pair 12, and oblique movement correction of the recording material P is made. The registration portion 7 is provided with a registration sensor 13 as a recording material detecting means. The registration sensor 13 detects an arrival timing of each of a leading end and a trailing end of the recording material P. The recording material P is conveyed to a transfer nip NT so as to be timed to the transfer image on the photosensitive drum 2 by the registration roller pair 12. The recording material P passes through the registration portion 7 and then is conveyed toward the transfer nip NT while being slid with and guided by an upper transfer guide 14 and lower transfer guide 15 which are guiding members as guiding means.

The recording material P supplied to the transfer nip NT is nipped and conveyed by the photosensitive drum 2 and the transfer roller 8. In this embodiment, the transfer roller 8 is an elastic roller of 14 mm in outer diameter, prepared by forming, on a core metal formed of SUS (stainless steel) in an outer diameter of 5 mm, a 4.5 mm-thick sponge elastic layer (elastic foam layer) formed of NBR and hydrin rubber. To the transfer roller 8, a predetermined transfer voltage (transfer bias) which is a DC voltage of an opposite polarity (positive polarity in this embodiment) to the normal charge polarity in a process in which the recording material P passes through the transfer nip NT is applied. By this, the transfer image on the photosensitive drum 2 is transferred onto an image forming surface (print surface, front surface) of the recording material P.

The recording material P on which the transfer image is transferred and which is separated from the surface of the photosensitive drum 2 is conveyed toward a heat fixing device 16 as a fixing means. The heat fixing device 16 heats and presses the recording material P carrying thereon an unfixed transfer image while conveying the recording material P in a fixing nip NF formed by a fixing roller pair, and thus fixes (melts, sticks) the transfer image on the recording material P. The recording material P after the transfer image is fixed thereon is discharged from the fixing nip NF of the heat fixing device 16 and is conveyed toward a discharging roller pair 17. By the discharging roller pair 17, the recording material P is discharged (outputted) onto a discharge tray 18 as a discharge portion provided on an outside of an apparatus main assembly 1*a* of the image forming apparatus 1.

Further, transfer (transfer residual transfer) remaining on the surface of the photosensitive drum 2 after the recording material P is separated from the photosensitive drum surface is removed and collected by a cleaning device 6 as a cleaning means. The cleaning device 6 includes a cleaning blade 61 as a cleaning member device so as to contact the surface of the photosensitive drum 2 and a cleaning container 62. The cleaning device 6 scrapes off the transfer residual transfer from the surface of the rotating photosensitive drum 2 by the cleaning blade 61 and accommodates the transfer residual toner in the cleaning container 62. By this, the surface of the photosensitive drum 2 is cleaned and subjected to repetitive image formation.

Incidentally, the image forming apparatus 1 of this embodiment operates at 55 sheets/min (letter sized paper) in print speed and about 300 mm/sec in process speed (peripheral speed of the photosensitive drum 2).

Further, in this embodiment, and as process means actable on the photosensitive drum 2, the charging roller 3, the developing device 5, and the cleaning device 6 integrally constitute a process cartridge detachably mountable to the apparatus main assembly 1*a* of the image forming apparatus 1.

(2) Constitution in the Neighborhood of Transfer Nip

Next, a constitution in the neighborhood of the transfer nip NT will be further specifically described.

Figure 2:
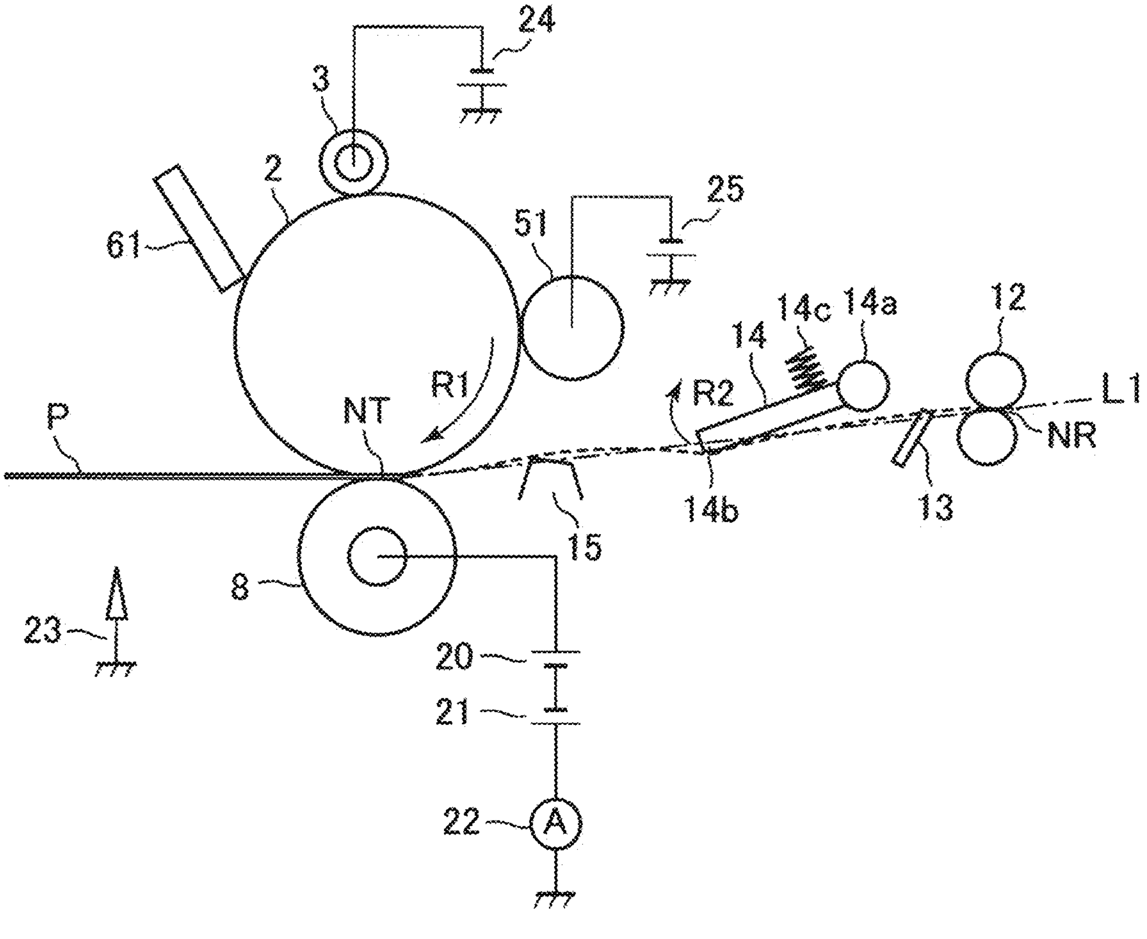
FIG. 2 is a schematic sectional view of a neighborhood of a transfer nip in the embodiment 1.

FIG. 2 is a schematic sectional view (showing a cross section substantially perpendicular to a rotational axis direction of the photosensitive drum 2) showing the constitution in the neighborhood of the transfer nip NT in this embodiment.

Here, as regards the recording material P, a leading end and a trailing end refer to a leading end and a trailing end with respect to the conveying direction of the recording material P when the recording material P passes through the transfer nip NT even if not explicitly specified. Further, as regards elements disposed along a conveying passage of the recording material P, upstream and downstream refer to upstream and downstream with respect to the conveying direction of the recording material P even if not explicitly specified. Further, as regards the image forming apparatus 1 and elements thereof, a front side of a paper (sheet) surface of FIG. 1 (front side of an arrow A direction) is a "front (front surface)" side, and a rear side of the paper surface of FIG. 1 (rear side of the arrow A direction) is a "rear (rear surface)" side, and a front rear direction connecting the front side and the rear side is substantially parallel to the rotational axis direction (direction substantially perpendicular to a surface movement direction) of the photosensitive drum 2. Further, the image forming apparatus 1 and the elements thereof, above and below refer to above and below with respect to a direction of gravitation (vertical direction), but do not necessarily mean immediately above and immediately below, and include upper side and lower side relative to a horizontal surface passing through a particular element or a particular position.

To the charging roller 3, a DC charging voltage power source 24 as a charging voltage applying means (charging voltage applying portion) for charging the photosensitive drum 2 is connected.

Further, to the developing roller 51, a DC developing voltage power source 25 as a developing voltage applying means (developing voltage applying portion) for depositing the toner on an image portion of the electrostatic latent image on the photosensitive drum 2 is connected.

Further, to the transfer roller 8, a positive DC transfer voltage power source 20 as a transfer voltage applying means (transfer voltage applying portion) for applying a transfer voltage and a negative DC transfer voltage power source 21 as a transfer reverse voltage applying means (transfer reverse voltage applying portion) for applying a transfer voltage are connected. Further, to the transfer roller 8, a current detecting portion (current detecting circuit) 22 as a current detecting means for carrying out transfer constant current control (described later) is connected. Incidentally, each of the positive transfer voltage power source 20 and the negative transfer voltage power source 21 also has a function as a voltage detecting means (voltage detecting portion).

Further, a discharging needle 23 which is a discharging member as a discharging means for the recording material P is provided on a side downstream of the transfer nip NT. This discharging needle 23 is disposed for the purpose of suppressing a trailing end memory by removing (discharging) at least a part of an electric charge imparted from the transfer roller 8 to the recording material P.

Further, the upper transfer guide 14 and the lower transfer guide 15 which are guiding members as guiding means for guiding the recording material P toward the transfer nip NT are provided on a side upstream of the transfer nip NT. The upper transfer guide 14 is disposed on a side downstream of the registration roller pair 12 (and in addition downstream of the registration sensor 13) and upstream of the lower transfer guide 15. The lower transfer guide 15 is disposed on a side downstream of the upper transfer guide 14 and upstream of the transfer nip N1.

The upper transfer guide 14 contacts the image forming surface of the recording material P (surface of the recording material P on a side where the surface of the photosensitive drum 2 contacts the recording material P when the recording material P having passed through the registration nip NR first passes through the transfer nip NT and thus restricts a conveying locus of the recording material P). In this embodiment, on a side downstream of the upper transfer guide 14 and upstream of the transfer nip NT, a member contacting the image forming surface of the recording material P is not provided.

Accordingly, in this embodiment, the image forming surface of the recording material P contacts the surface of the photosensitive drum 2 subsequently to the upper transfer guide 14. Further, the lower transfer guide 15 contacts a non-image forming surface of the recording material P (surface on a side opposite from a side where the surface of the recording material P when the recording material P having passed through the registration nip NR then first passes through the transfer nip NT) and thus restricts the conveying locus of the recording material P. That is, with respect to a rectilinear line L1 passing through the registration nip NR and the transfer nip NT in a cross section shown in FIG. 2, the upper transfer guide 14 enters a lower side (transfer roller 8 side) in FIG. 2, and the lower transfer guide 15 enters an upper side (photosensitive drum 2 side) in FIG. 2. By this, the recording material P is conveyed toward the transfer nip NT while being slid and guided by the upper transfer guide 14 and the lower transfer guide 15 after having passed through the registration portion 7. Thus, the recording material P is guided by the upper transfer guide 14 so as to be once pressed down toward the lower side in FIG. 2 and then is guided by the lower transfer guide 15 so as to be pressed up toward the upper side in FIG. 2 (conveying locus of the recording material P in a substantially S shape in the cross section shown in FIG. 2). By this, the recording material P is conveyed toward the transfer nip NT while being deformed in a substantially constant shape by the upper transfer guide 14 and the lower transfer guide 15, so that it becomes possible that the recording material P is guided appropriately to the transfer nip NT irrespective of a kind and a state of the recording material P. The upper transfer guide 14 will be further specifically described later.

(3) Transfer Voltage Control

Next, transfer voltage control in the image forming operation will be described. In this embodiment, the image forming apparatus 1 carries out control in which ATVC (auto transfer voltage control), constant-voltage control, and trailing end voltage control are combined with each other.

Figure 3:
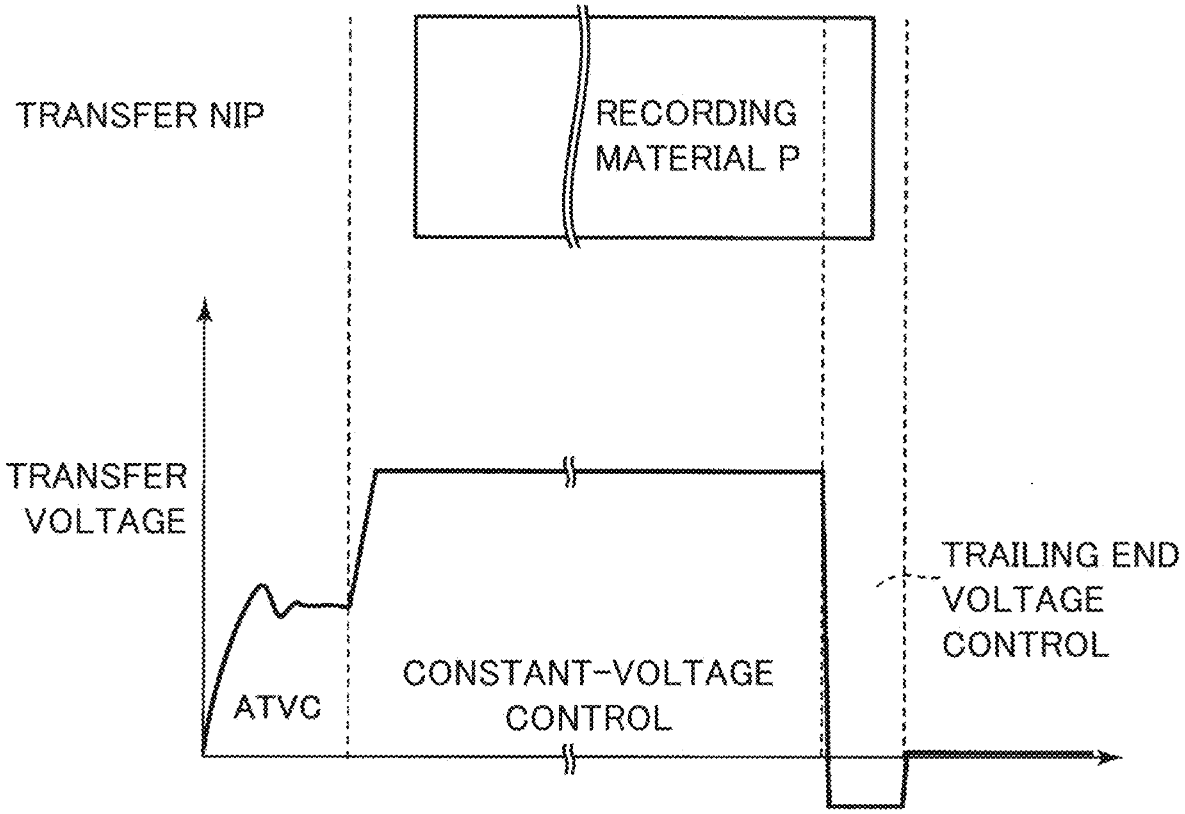
FIG. 3 is a schematic view for illustrating transfer voltage control.

FIG. 3 is a schematic view for illustrating the transfer voltage control in this embodiment. In FIG. 3, a graph (lower view) showing a progression of the transfer voltage and a schematic view (upper view) showing a position of the recording material P passing through the transfer nip NT at each point of a time indicated in the abscissa of the graph are shown.

First, the ATVC will be described. The ATVC is control executed before the recording material P is conveyed to the transfer nip NT. In the case of executing the ATVC, a controller 120 as a control means controls the positive transfer voltage power source 20 to apply an initial voltage to the transfer roller 8, and waits until output of the initial voltage is stabilized. Thereafter, the controller 120 samples a detection result of a current for a predetermined time by the current detecting portion 22 and then calculates an average value of the current. Then, the controller 120 compares this average value with a target current of the ATVC and changes a voltage subsequently applied to the transfer roller 8 so as to be made small in difference therebetween. The controller 120 carries out control so that an average value of the detection result of the current detecting portion 22 converts to the target current of the ATVC (transfer constant current control). By carrying out this control, a base voltage V necessary to flow a current to the transfer nip NT can be grasped. By this, from a target current I and the base voltage V of the ATVC, on the basis of the following formula (1), it becomes possible to grasp an electric resistance value R of the transfer roller 8 (transfer nip NT).

$$R = V / I \quad \text{formula (1)}$$

On the basis of the electric resistance value R, a transfer voltage during image formation (during transfer) can be determined. In this embodiment, the initial voltage was set to 500 V, a stable waiting time of the initial voltage was set to 100 ms, a sampling time of the current was set to 50 ms, and the target current I of the ATVC was set to 10 μA. Incidentally, instead of use of the electric resistance value R, by using the base voltage V necessary to flow the target current I, the transfer voltage during the image formation (during the transfer) may be determined.

Next, the constant-voltage control will be described. The constant-voltage control is control carried out for principally transferring the toner onto the recording material P. Before the recording material P is conveyed to the transfer nip NT, similarly as the ATVC, the controller 120 controls the positive transfer voltage power source 20, so that a voltage is applied to the transfer roller 8. A value of the voltage applied to the transfer roller 8 can be determined by making reference to a result of the ATVC, a kind of the recording material P, a range of the toner image formed on the photosensitive drum 2, and the like. For example, the controller 120 is capable of determining the transfer voltage during the image formation (during the transfer) by adding a recording material part voltage set in advance for each kind of the recording material P to the base voltage V necessary to flow the target current I acquired in the ATVC. The controller 120 is capable of acquiring the recording material part voltage on the basis of, for example, information on the kind of the recording material P included in a print instruction inputted from an external device. In this embodiment, a voltage of +1800 V which is a DC voltage of a polarity opposite to a normal charge polarity of the toner (i.e., a charge polarity of the photosensitive drum 2) is supplied from the positive transfer voltage power source 20 to the transfer roller 8 so that a convey of about 20 mA flows.

Incidentally, the kind of the recording material P includes arbitrary information capable of discriminating the recording material, such as attributes (paper kind category) based on a general feature such as plain paper, high-quality paper, recycled paper, glossy paper, coated paper, thick paper, or thin paper; numerical values and numerical value images such as a basis weight, a thickness, and the like; or brand (including a manufacturer, a product number, or the like, and the like. The basis weight of the thin paper is, for example, 52-63 $g/m^2$, the basis weight of the plain paper is, for example, 64-105 $g/m^2$, and the basis weight of the thick paper is, for example, 106-256 $g/m^2$.

Next, the trailing end voltage control will be described. The trailing end voltage control is a control executed for suppressing the trailing end memory. In this embodiment, in a predetermined period from before a trailing end of the recording material P is discharged from the transfer nip NT until after the trailing end of the recording material P is disposed from the transfer nip NT, as the trailing end voltage control, the controller 120 carries out control so that a voltage of the same polarity as the normal charge polarity (i.e., the charge polarity of the photosensitive drum 2) is applied to the transfer roller 8. Specifically, in this embodiment, the predetermined period is a period corresponding to a section from a position of 5 mm before the trailing end of the recording material P is discharged from the transfer nip NT (region corresponding to a trailing end margin of the recording material P) to a position of 10 mm after the trailing end of the recording material P is discharged, i.e., corresponding to a section of 15 mm in total. Further, in this embodiment, in this predetermined period, the controller 120 carries out control so that a voltage (trailing end voltage) of −200 V is applied to the transfer roller 8 by turning off (OFF) the output of the positive transfer voltage power source 20 and by turning on (ON) the output of the negative transfer voltage power source 21. A positive-polarity charge amount of the trailing end of the recording material P is decreased by the trailing end voltage control, so that peeling electric discharge can be reduced between the photosensitive drum 2 and the recording material P when the trailing end of the recording material P passes through the transfer nip NT. Further, the trailing end voltage control is executed at a timing determined in view of a detection result of the leading end and the trailing end of the recording material P by the registration sensor 13 and a conveying distance of the recording material P between the registration sensor 13 and the transfer nip NT. By this, it becomes possible to control the transfer voltage in synchronism with a timing when the recording material P passes through the transfer nip NT.

(4) Occurrence Mechanism of Trailing End Memory

Next, an occurrence mechanism of the trailing end memory resulting from the peeling electric discharge will be described. Parts (a) and (b) of FIG. 4 are schematic views for illustrating the occurrence means of the trailing end memory. In parts (a) and (b) of FIG. 4, signs of "+" and "−" schematically show charging states of the surface of the photosensitive drum 2 and the surface of the recording material P.

Part (a) of FIG. 4 shows a state during passing of the recording material P through the transfer nip NT. As described above, during the image formation (during the transfer), to the transfer roller 8, the transfer voltage of the positive polarity is applied. By this, to the non-image forming surface of the recording material P, an electric charge of the positive polarity is imparted, so that the toner image on the photosensitive drum 2 can be transferred onto the recording material P. When the transfer of the toner (image) is completed in the transfer nip NT, the electric charge imparted to the recording material P is removed (discharged) to some extent by a discharging needle 23. Further, as described above, in order to form the image, the surface of the photosensitive drum 2 is charged to the negative polarity by the charging roller 3.

Part (b) of FIG. 4 shows a state after the trailing end of the recording material P passed through the transfer nip NT.

In this state, to the non-image forming surface, the positive-polarity electric charge after removed to some extent by the discharging needle 23 is imparted. Further, also in this state, similarly as in the state of part (a) of FIG. 4, the surface of the photosensitive drum 2 is charged to the negative polarity by the charging roller 3. However, this state is different from the state of part (a) of FIG. 4, and is a state after the trailing end of the recording material P passed through the transfer nip NT, and in this state, the neighborhood of the trailing end of the recording material P separated from the photosensitive drum 2 and the surface of the photosensitive drum 2 are close to each other. Here, the non-image forming surface of the recording material P is charged to the positive polarity, and the surface of the photosensitive drum 2 is charged to the negative polarity, and therefore, even before the recording material P is separated from the photosensitive drum 2, a relatively large potential difference is generated between the non-image forming surface of the recording material P and the photosensitive drum 2. By this potential difference, the electric charge is accumulated in the recording material P, so that the recording material P performs a function like a capacitor. Thus, when the recording material P is separated from the photosensitive drum 2 in a state in which the electric charge is accumulated, i.e., a state in which the recording material P is charged, an apparent electrostatic capacity abruptly decreases, so that a potential difference between the recording material P and the photosensitive drum 2 abruptly increases. Then, when this potential difference exceeds an electric discharge threshold, peeling electric discharge occurs, so that the electric charge of the positive polarity is abruptly moved to the photosensitive drum 2. When this peeling electric discharge is conspicuous, the influence of the peeling electric field cannot be canceled by the charging process by the charging roller 3, and even after passing through the charging roller 3, a portion affected by the peeling electric discharge becomes a state partially smaller in charge amount when compared with a peripheral portion (a state in which an absolute value of the potential is small). For that reason, in a developing portion, the toner is deposited in a larger amount on a portion where the charge amount is small. As a result, the portion on the photosensitive drum 2 affected by the peeling electric discharge appears as an image defect in a black stripe shape (stripe-shaped density non-uniformity extending in a rotational axis direction of the photosensitive drum 2) after one rotation of the photosensitive drum 2.

The above is the occurrence mechanism of the trailing end memory (transfer memory) due to the peeling electric discharge.

Incidentally, a reason why the transfer voltage in the neighborhood of the trailing end of the recording material P is changed by the above-described trailing end voltage control of the recording material P is that the peeling electric discharge is suppressed by lowering the charge amount in the neighborhood of the trailing end of the recording material P as can as possible as described as to the above-described occurrence mechanism of the trailing end memory.

(5) Recording Material Charging Member and Trailing End Memory Suppressing Mechanism Next, with reference to FIG. 2, the upper transfer guide 14 in this embodiment will be further described specifically. In this embodiment, the trailing end memory is suppressed by utilizing the upper transfer guide 14 as the recording material charging member (recording material charging means).

In this embodiment, the upper transfer guide 14 functioning as the recording material charging member is a thin plate-like member formed of a PC (polycarbonate) resin material. The upper transfer guide 14 has a predetermined length in each of a longitudinal direction extending substantially in parallel to the rotational axis direction of the photosensitive drum 2 and a widthwise (short-side) direction substantially perpendicular to the longitudinal direction, and has a predetermined thickness. In this embodiment, the upper transfer guide 14 is not substantially deformed by contact with the recording material P. In this embodiment, as the material constituting the upper transfer guide the material (PC resin) of $3\times10^{14}\Omega$ in volume resistivity is used. Further, the upper transfer guide 14 has a function of being triboelectrically charged by friction with the recording material P (i.e., a function of triboelectrically charging the recording material P). Specifically, in the image forming apparatus 1 of this embodiment, in the case where as the recording material P, for example, a recording sheet (plain paper) ("CS-068", basis weight: 68 $g/m^2$, manufactured by Canon K.K.) is conveyed, by the triboelectric charge, a polarity of a surface potential of the upper transfer guide 14 becomes the positive polarity, and a polarity of a third potential of the image forming surface of the recording material P becomes the negative polarity. Incidentally, the surface potential of the upper transfer guide 14 and the surface potential of the recording material P were measured by using a measuring device ("HIGH SPEED ELECTROSTATIC VOLT METER", manufactured by TREK) provided with a probe ("MODEL 3800S", manufactured by TREK).

Further, the upper transfer guide 14 is constituted so as to be rotatable about a guide rotation shaft 14*a* as a rotation center in an arrow R2 direction (clockwise direction) and a direction opposite thereto. A rotational axis of the guide rotation shaft 14*a* is substantially parallel to a rotational axis direction of the photosensitive drum 2 (longitudinal direction of the upper transfer guide 14), i.e., a front-rear direction of the image forming apparatus 1. In this embodiment, the guide rotation shaft 14*a* is provided at an end portion of the upper transfer guide 14 on an upstream side (on the registration nip NR side). Further, in this embodiment, the upper transfer guide 14 contacts the recording material P at a free end portion (contact portion) 14*b* thereof on a downstream side (on the transfer nip NT side). In a state in which the upper transfer guide 14 does not rotate in the arrow R2 direction, the free end portion 14*b* is disposed to enter a rectilinear line L1, toward a lower side (the transfer roller 8 side), passing through the registration nip NR and the transfer nip NT in the cross section shown in FIG. 2. The upper transfer guide 14 rotates about the guide rotation shaft 14*a*, so that the free end portion 14*b* which is a contact portion of the upper transfer guide 14 with the recording material P is movable in a direction crossing a surface of the recording material P (conveyed from the registration nip NR toward the transfer nip NT) in a position where the recording material P opposes the upper transfer guide 14. Further, a width of the upper transfer guide 14 in the rotational axis direction of the photosensitive drum 2 is wider than the image forming region (toner image formable region) on the photosensitive drum 2 in the same direction (i.e., the image forming region falls within the width of the upper transfer guide 14). A width of the image forming region (a maximum width corresponding to a maximum recording material P on which the image forming apparatus 1 is capable of forming an image) is 210 mm, for example. Incidentally, the upper transfer guide 14 is not limited to a constitution in which the upper transfer guide 14 contacts a whole area of the image forming surface of the recording material P with respect to the conveying direction, but may also be contactable to a part of the image forming surface of the recording material P with respect to the conveying direction depending on a setting of a conveying locus or the like. However, the upper transfer guide 14 may desirably be contactable to at least a trailing end of the recording material P and the neighborhood thereof (trailing end portion) with respect to the conveying direction of the recording material P.

Further, the upper transfer guide 14 is pressed (urged) by a pressing spring 14*c* which is an elastic member (urging member) as an urging means in a direction in which a free end portion 14*b* of the upper transfer guide 14 rotates downward (in a direction opposite to the arrow R2 direction) in FIG. 2 so as to contact the recording material P. Further, the image forming apparatus 1 is constituted so that a force for pushing up the free end portion 14*b* of the upper transfer guide 14 upward (in the arrow R2 direction) in FIG. 2 by the recording material P acts on the upper transfer guide 14 in a state in which the recording material P contacts both the upper transfer guide 14 and the transfer nip NT. Specifically, a position of the registration roller pair 12, a discharging angle of the recording material P from the registration roller pair 12, a position of the lower transfer guide 15, or the like are adjusted so that the above-described force acts on the upper transfer guide 14. Particularly, in the case where, as the recording material P, paper which is generally called the thick paper and which is larger in basis weight (high in rigidity) is conveyed, a stronger force acts on the upper transfer guide 14 when compared with the case where, as the recording material P, paper generally called plain paper, paper generally called thin paper, or the like is conveyed. In this embodiment, by a setting of a self-weight of the upper transfer guide 14 and a pressing force of the pressing spring 14*c*, the upper transfer guide 14 is rotated upward (in the arrow R2 direction) in FIG. 2 in the case where a force of 0.59N acts on the free end portion 14*b* of the upper transfer guide 14. This is because, as specifically described later, in the case where the thick paper high in rigidity or the like paper is conveyed, the triboelectric charge of the upper transfer guide 14 is not excessively made.

Next, the trailing end memory suppressing mechanism in this embodiment will be described. FIG. 5 is a schematic view for illustrating the trailing end memory suppressing mechanism in this embodiment. In FIG. 5, signs "+" and "−" schematically shows charging states of the surface of the photosensitive drum 2 and the surface of the recording material P. As described above, the free end portion 14*b* of the upper transfer guide 14 contacts the recording material P and triboelectrically charges the recording material P. Specifically, in the image forming apparatus 1 of this embodiment, in the case where as the recording material P, for example, the recording sheet (plain paper ("CS-068", basis weight: 68 g/m$^2$, manufactured by Canon K.K.) is conveyed, by the triboelectric charge, the upper transfer guide 14 is positively charged, and the image forming surface of the recording material P is negatively charged. In order to express this action, on the image forming surface of the recording material P (on an upper side in FIG. 5) on a side upstream of the transfer nip NT (on a right side) in FIG. 5, charging of the recording material P to the negative polarity is represented schematically by the sign "−".

As described above, after the recording material P passes through the transfer nip NT, by the influence of the transfer voltage of the positive polarity applied to the transfer roller 8, to the non-image forming surface of the recording material P, the electric charge of the positive polarity is imparted. Then, by the peeling electric discharge generating when the trailing end of the recording material P passes through the transfer nip NT and is separated from the photosensitive drum 2, the electric charge is moved. An amount of the electric charge moved by this peeling electric discharge (herein, this amount is also referred to as a "peeling electric discharge amount") is determined by a charging amount (specifically, a charging amount of the positive polarity which is the polarity opposite to the charge polarity of the photosensitive drum 2) of the recording material P.

Here, in this embodiment, by the upper transfer guide 14, the image forming surface of the recording material P is charged to the negative polarity. By this action, the negative polarity of the image forming surface and the positive polarity of the non-image forming surface consequently attribute to the charge amount of the recording material P in directions of offsetting each other. That is, in this embodiment, compared with the case where the action by the upper transfer guide 14 was not present, the charge amount of the recording material P when the recording material P is separated from the photosensitive drum 2 can be made small. By this, the detect electric discharge amount when the recording material P is separated from the photosensitive drum 2 is reduced, with the result that the trailing end memory can be suppressed.

(6) Material of Recording Material Charging Member

Next, a material of the recording material charging member will be further described. First, an evaluation method of a triboelectric charging performance of the recording material charging member will be described. The triboelectric charging performance of the recording material charging member is roughly capable of being evaluated to selecting a specific recording material as the recording material P, by rubbing the recording material P with an evaluation member formed of a material desired to be evaluated under application of a certain load, and then by measuring a surface potential of the evaluation member. In this embodiment, as the recording material P for evaluating the triboelectric charging performance of the recording material charging member, the recording sheet (plain paper) ("CS-068", basis weight: 68 g/m$^2$, manufactured by Canon K.K.) was selected. A friction condition between the recording material P and the evaluation member was as follows. A quadrangular contact probe of 15 mm×15 mm in contact range of the recording material P for evaluation with the evaluation member is subjected to five times of reciprocation of 20 mm in width in a state that a load of about 0.98N is applied. Thereafter, the surface potential of the evaluation member was measured by using the probe ("MODEL 3800S-2", manufactured by TREC) connected to the measuring device ("HIGH SPEED ELECTROSTATIC VOLT METER", manufactured by TREK). Further, as the evaluation member, an almost planar member having substantially no surface unevenness was used. Further, as the evaluation member, a member sufficiently wider than a reciprocation width of the contact probe, for example, a quadrangular member of 50 mm×50 mm was used.

In a table 1, examples of the material of the evaluation member as the recording material charging member and an evaluation result thereof are shown.

TABLE 1

| MATERIAL*[1] | SP*[2] | CP*[3] | EF*[4] |
|---|---|---|---|
| PC | +1.5 to 2 kV | NEGATIVE | YES |
| ABS | +1.5 to 2 kV | NEGATIVE | YES |
| PC + ABS | +1.5 to 2 kV | NEGATIVE | YES |
| POM | +1.5 to 2 kV | NEGATIVE | YES |
| PET + GF | +1.5 to 2 kV | NEGATIVE | YES |
| PBT + GF | +1.5 to 2 kV | NEGATIVE | YES |
| PPE + PS | +1.5 to 2 kV | POSITIVE | NO |

*[1]"MATERIAL" is the material of the evaluation member. "GF" is glass fiber.
*[2]"SP" is the surface potential (approximate value) after rubbed with the recording material.
*[3]"CP" is the charge potential of the recording material.
*[4]"EF" is employment feasibility.

For example, the evaluation result of the PC resin used as the material of the upper transfer guide 14 will be described. As shown in the table 1, the surface potential of the PC resin evaluation member in the above-described evaluation method is about +1.5 kV to about +2.0 kV, so that it was confirmed that the evaluation member was charged to the positive polarity by friction with the recording material P. In general, it has been known that when triboelectric charge occurs, relative to the charge polarity of one of two members, the other member is charged to the opposite polarity. For that reason, in this case, the recording material P is charged to the negative polarity by the friction with the evaluation member. A feature of this embodiment is in that the trailing end memory is suppressed by charging the recording material P to the same polarity (negative polarity in this embodiment) as the charge polarity of the photosensitive drum 2 by the recording material charging member as described above. From this viewpoint, a constitution in which the recording material charging member triboelectrically charges the recording material P to the negative polarity, i.e., a constitution in which the recording material charging member is charged to the positive polarity may only be required to be employed. Accordingly, the PC resin is suitable as the material of the recording material charging member.

Similarly, as shown in the table 1, ABS (acrylonitrile-butadiene-styrene) copolymer resin, PC+ABS alloy resin, POM (polyoxymethylene) resin, PET (polyethylene terephthalate) resin, resin in which glass fibers are mixed in the PET resin, and resin in which glass fibers are mixed in PBT (polybutylene terephthalate) resin are suitable as the material of the recording material charging member.

Incidentally, the material of the recording material charging member may only be required to enable that the recording material P is triboelectric charged to the same polarity as the charge polarity of the photosensitive drum 2, and is not limited to the above-described examples thereof. Further, the recording material charging member is not limited to that entirety thereof is constituted by a material principally comprising the resin such as the above-described examples thereof. The recording material charging member may only be required to be provided, at the surface thereof contacting the recording material P, with a material capable of triboelectric charging the recording material P to the same polarity as the charge polarity of the photosensitive drum 2. For example, a similar effect can be obtained even when to a surface, contacting the recording material P, of a base material formed of an arbitrary material (for example, a resin material), a substance or a component which has the triboelectric charging performance as described above is applied or a member having the triboelectric charging performance as described above is stuck. Further, in this embodiment, the recording material charging member is the member for triboelectrically charging the recording material P to the negative polarity, but is not limited thereto. For example, in the case where the charge polarity of the photosensitive drum 2 is the positive polarity, the recording material charging member may only be required to be a member for triboelectrically charging the recording material P to the positive polarity.

(7) Image Output Experiment Result

A result of an image output experiment conducted for constitutions of this embodiment and comparison examples (described later) will be described. In the image output experiment, occurrence degrees of the above described "trailing end memory" and a "black spot image" (described later) were evaluated.

First, an evaluation method of the "trailing end memory" will be described. Incidentally, the occurrence of the "trailing end memory" is as described above. The "trailing end memory" was evaluated by executing continuous printing corresponding to two sheets of the recording materials P in a normal temperature/normal humidity environment. During image formation (during transfer), a voltage of +1800 V was supplied from the positive transfer voltage power source 20 to the transfer roller 8 so that a current of about 20 μA flows.

Further, a pattern of an image formed in the continuous printing is a relatively low-print ratio character image (print ratio: about 5%) for a first sheet and is a half-tone image (print ratio: about 50%), easy to discriminate an occurrence of the "trailing end memory", for a second sheet. Further, as the recording material P, the recording sheet (plain paper) ("CS-068", basis weight: 68 g/m$^2$, manufactured by Canon K.K.) was used. Further, occurrence or non-occurrence of the "trailing end memory (black stripe-shaped image defect)" on the recording material P outputted by the continuous printing was checked by eye observation.

Next, an occurrence mechanism and an evaluation method of the "black spot image" will be described. The "back spot image" is an image defect occurring in the case where the recording material charging member is excessively triboelectrically charged, and specifically is a phenomenon such that in the case where a half-tone image or the like is formed, a density thereof becomes thick partially in a dot shape. A charge amount when the recording material charging member is charged by friction thereof with the recording material P is changed by an operation environment of the image forming apparatus 1, a kind of the recording material P, or a printed sheet number.

As regards the operation environment of the image forming apparatus 1, there is a tendency that the charge amount of the recording material charging member becomes large in the case where the image forming apparatus is operated in a relatively low humidity environment. This is because in the case where the operation environment of the image forming apparatus 1 is a low humidity environment, there is a tendency that natural attenuation such that a triboelectric charge accumulated on the recording material charging member is gradually discharged into the air does not readily occur and thus a charge state is easily maintained. In addition, in the case where the operation environment of the image forming apparatus 1 is the low humidity environment, the recording material P itself has a tendency to be in a dry state and to become high in electric resistance, and the recording material charging member has a tendency to be largely charged even when the recording material charging member rubs with the recording material P by the same number of sheets. Further, as regards the kind of the recording material P, in the case where the recording material P having a large basis weight, i.e., thick paper relatively high in rigidity, is used, there is a tendency that the charge amount of the recording material charging member becomes large. As specifically described later, this is because in the case where thick paper or the like is conveyed as the recording material P, there is a tendency that the recording material charging member and the recording material P strongly rub with each other. This is particularly noticeable in the case of employing a constitution in which the upper transfer guide 14 functioning as the recording material charging member is not rotated as in a comparison example 1 (described later) not employing a constitution in which the upper transfer guide 14 functioning as the recording material charging member is rotated as in this embodiment. Further, as regards the number of printed sheets, in the case where images are formed in a short time on recording materials P in a large number of sheets, there is a tendency that the charge amount of the recording material charging member becomes large. This is because a rubbing time ratio per unit time of the recording material charging member by the recording material P increases and thus the charge amount of the recording material charging member becomes large.

Thus, when the charge amount of the recording material charging member becomes large depending on the operation environment of the image forming apparatus 1, the kind of the recording material P, or the number of printed sheets, in addition to the triboelectric charge of the recording material P by the recording material charging member, an electric discharge phenomenon from the recording material charging member to the recording material P occurs. In the case where this electric discharge phenomenon is conspicuous, on the image forming surface of the recording material P, electric charge non-uniformity due to this electric discharge occurs in some instances. For example, as in this embodiment, in the case where the recording material charging member is charged to the positive polarity, positive electric discharge occurs for the recording material P, and therefore, on the surface of the recording material P, a non-uniform dot-like charging portion of the positive polarity generates. Further, in this embodiment, the toner is charged to the negative polarity, and therefore, when the recording material P is conveyed to the transfer nip NT in a state in which the recording material P is charged to the positive polarity so as to generate the non-uniform dot-like charging portion, a part of the toner gathers at this charging portion of the positive polarity when the toner image is transferred onto the recording material P, so that this toner appears as a "black spot image" in which a resultant image at the charging portion becomes locally thick compared with another portion.

The "black spot image" was evaluated by executing continuous printing of images on 200 sheets of the recording materials P in a relatively low-humidity environment in which a relative humidity is 15%. During the image formation (during the transfer), a voltage of +4200 V was supplied from the positive transfer voltage power source 20 to the transfer roller 8 so that a current of about 15 μA flows.

Further, a pattern of the images formed in the continuous printing was a half-tone image (print ratio: about 50%) on which occurrence of the "black spot image" is easily discriminated. Further, as the recording material P, a recording sheet (thick paper) ("Springhill Digital Index", basis weight: 199 g/m$^2$, manufactured by Springhill Co.) was used. Then, occurrence or non-occurrence of the "black spot image" on the recording material P outputted by the continuous printing was checked by eye observation.

In a table 2, a performance evaluation result of this embodiment (embodiment 1) and comparison examples (comparison example 1 and comparison example 2) is shown.

TABLE 2

| | UTGM*[1] | UTGR*[2] | TEM*[3] | BSI*[4] |
|---|---|---|---|---|
| Emb. 1 | PC | ROT | NO | NO |
| COMP. EX. 1 | PC | NR | NO | SO |
| COMP. EX. 2 | SUS + G | ROT | SO | NO |

*[1]"UTGM" is a upper transfer guide material. "G" is grounding.
*[2]"UTGR" is upper transfer guide rotation. "ROT" shows that the upper transfer guide is rotatable, and "NP" shows that the upper transfer guide is not rotatable.
*[3]"TEM" is the trailing end memory. "NO" shows that the trailing end memory occurred, and "SO" shows that the trailing end memory slightly occurred.
*[4]"BSI" is the black spot image. "NO" shows that the black spot image occurred, and "SO" shows that the black spot image slightly occurred.

First, the evaluation result of this embodiment (embodiment 1) will be described. Part (a) of FIG. 6 is a schematic sectional view of the upper transfer guide 14 functioning as the recording material charging member in this embodiment. In this embodiment, the recording material P was triboelectrically charged to the negative polarity by the upper transfer guide 14, so that the trailing end memory did not occur. Further, in this embodiment, the free end portion 14*b* of the upper transfer guide 14 is capable of being rotated and escaped by a force received from the recording material P. Thus, in this embodiment, it is possible to suppress not only the "trailing end memory" but also the "black spot (image)", so that a good quality image can be formed.

Next, the evaluation result of the comparison example 1 will be described. Part (b) of FIG. 6 is a schematic sectional view of the upper transfer guide 14 functioning as the recording material charging member in the comparison example 1. In the embodiment 1, the guide rotation shaft 14*a* and the pressing spring 14*c* are not provided, so that the upper transfer guide 14 is fixedly disposed so as not to be rotated (moved). Other constitutions of the upper transfer guide 14 in the comparison example 1 are substantially the same as those of the upper transfer guide 14 in this embodiment. Accordingly, a position of the upper transfer guide 14 in the comparison example 1 is the same as the position of the upper transfer guide 14 in this embodiment when the upper transfer guide 14 in this embodiment is not rotated by the recording material P. In the comparison example 1, similarly as in this embodiment, the recording material P is triboelectrically charged to the negative polarity by the upper transfer guide 14, and therefore, the trailing end memory did not occur. However, in the comparison example 1, the upper transfer guide 14 is not rotated, and therefore, particularly in the case where the thick paper is conveyed, compared with this embodiment, the upper transfer guide 14 and the recording material P rub with each other more strongly. For that reason, in the comparison example 1, the black spot image due to excessive charging of the upper transfer guide 14 occurred. That is, in this embodiment, in the case where the thick paper is conveyed, the upper transfer guide 14 can be rotated and escaped depending on a load received from the recording material P. For that reason, in this embodiment, it is possible to suppress that the recording material P and the upper transfer guide 14 strongly rub with each other under an excessive load. Further, by this action, it is possible to suppress that the upper transfer guide 14 is excessively charged. On the other hand, in the comparison example 1, the upper transfer guide 14 is not rotated. For that reason, in the comparison example 1, the recording material P and the upper transfer guide 14 rub with each other with a relatively strong force, and therefore, the charge amount of the upper transfer guide 14 is liable to become large.

Next, the evaluation result of the comparison example 2 will be described. Part (c) of FIG. 6 is a schematic sectional view of the upper transfer guide 14 in the comparison example 2. In this embodiment, the free end portion 14*b* which is the contact portion of the upper transfer guide 14 with the recording material P is provided with an electroconductive coating member 14*d* formed of SUS which is an electroconductive material, and in addition, this coating member 14*d* is electrically grounded. Other constitutions of the upper transfer guide 14 in the comparison example 2 is substantially the same as those of the upper transfer guide 14 in this embodiment. In the comparison example 2, similarly as in this embodiment, the upper transfer guide 14 is rotatable, and in addition, the electroconductive coating member 14*d* is originally electrically grounded, and therefore, the upper transfer guide 14 is prevented from being charged. For that reason, in the comparison example 2, the black spot image did not occur. However, in the comparison example 2, the recording material P is not triboelectrically charged by the upper transfer guide 14, so that the trailing end memory slightly occurred.

As described above, in this embodiment, the upper transfer guide 14 functioning as the recording material charging member is capable of triboelectrically charging the recording material P to the same polarity as the charge polarity of the photosensitive drum 2. By this, peeling electric discharge between the photosensitive drum 2 and the recording material P when the recording material P passes through the transfer nip NT is suppressed, so that the trailing end memory can be suppressed. Further, in this embodiment, the upper transfer guide 14 functioning as the recording material charging member can be rotated and escaped by the force received from the recording material P in the case where the thick paper is conveyed as the recording material P or in the like case. By this, the upper transfer guide 14 is suppressed from being excessively triboelectrically charged, so that it is possible to suppress the black spot image. Thus, according to this embodiment, it is possible to suppress both the trailing end memory and the black spot image.

Incidentally, in this embodiment, in the trailing end voltage control, from the viewpoint of reducing the charge amount of the recording material P as can as possible, the voltage (trailing end voltage) of the negative polarity (which is the same polarity as the charge polarity of the photosensitive drum 2) was applied, but the present invention is not limited thereto. For example, in the case where the image forming apparatus 1 does not include a power source for outputting the voltage of the negative polarity, a voltage of the positive polarity (which is the opposite polarity to the charge polarity of the photosensitive drum 2) smaller in absolute value than a transfer voltage applied in constant-voltage control during the image formation (during the transfer). By this, the charge amount of the recording material P can be reduced to the extent possible. That is, in the case where the recording material P passes through the transfer nip NT, a voltage which has the oppose polarity to the normal charge polarity of the toner (i.e., the charge polarity of the photosensitive drum 2) and which is smaller in absolute value than a voltage applied to the transfer roller 8 when a center and its vicinity (central portion) of the recording material P with respect to the conveying direction of the recording material P pass through the transfer nip NT may be applied to the transfer roller 8. Further, in the case where a trailing end memory suppressing effect by the recording material charging member is high, for example, a voltage applied in a period similar to a period in which the trailing end voltage control in this embodiment is carried out can also be made a voltage which is the same as the transfer voltage applied in the constant-voltage control during the image formation (during the transfer).

Further, in this embodiment, an example in which a specific recording sheet (plain paper, thick paper) was used for evaluation was described. However, according to study by the present inventor, even in the case of paper other than the specific recording sheet in the above-described example, when the paper is usable in the image forming apparatus of the electrophotographic type, an almost similar effect can be obtained.

Thus, in this embodiment, the image forming apparatus includes a rotatable image bearing member (photosensitive drum) 2; a charging device 3 configured to electrically charge a surface of the image bearing member 2 to a predetermined polarity; a developing device 5 configured to form a toner image on the surface of the image bearing member 2 by supplying toner, charged to the same polarity as the predetermined polarity, to the surface of the image bearing member 2 charged by the charging device 3; a transfer member 8 configured to form a transfer nip NT between itself and the image bearing member 2 in contact with the surface of the image bearing member 2 and to transfer the toner image from the image bearing member 2 onto a recording material P passing through the transfer nip NT under application of a transfer voltage; and applying portions 20 and 21 configured to apply, to the transfer member 8, the transfer voltage of a polarity opposite to the predetermined polarity. The image forming apparatus further includes a recording material charging member 14 provided on a side upstream of the transfer nip NT with respect to a conveying direction of the recording material P nipped and conveyed through the transfer nip NT and capable of contacting an image forming surface which is a surface of the recording material P, onto which the toner image is transferred, conveyed toward the transfer nip NT, and capable of charging the image forming surface to the same polarity as the predetermined polarity by triboelectric charge. A contact portion 14*b* of the recording material charging member 14 with the recording material P is movable in a direction crossing the surface of the recording material P in a position where the recording material P opposes the recording material charging member 14. In this embodiment, with respect to the conveying direction, the recording material charging member 14 is disposed on a side downstream of a conveying member (registration roller pair) 12 for conveying the recording material P at a closest position to the transfer nip NT on a side upstream of the transfer nip NT. Further, in this embodiment, the recording material charging member 14 has a function of guiding the recording material P the recording material conveyed toward the transfer nip NT. Further, in this embodiment, the image forming surface of the recording material contacts the surface of the image bearing member 2 subsequently to the recording material charging member 14. Further, in this embodiment, the contact portion 14*b* of the recording material charging member 14 is moved by a force received from the recording material P. Particularly, in this embodiment, the contact portion 14*b* of the recording material charging member 14 is moved by rotation of the recording material charging member 14. Further, in this embodiment, the image forming apparatus includes an urging means (pressing spring) 14*c* configured to urge the recording material charging member 14 in a direction in which the contact portion of the recording material charging member 14 is moved from a side of the image forming surface toward a side of a surface opposite from the image forming surface. Further, in this embodiment, the recording material P has a first kind and a second kind larger in basis weight than the recording material of the first kind, and the urging means 14*c* is configured so as to be capable of being positioned on a more downstream side of a direction in which the contact portion 14*b* of the recording material charging member 14 is moved from the side of the surface opposite from the image forming surface toward the side of the image forming surface in a case that the recording material P of the second kind is conveyed toward the transfer nip NT than in a case that the recording material P of the first kind is conveyed toward the transfer nip NT. Here, the recording material charging member 14 may desirably be contactable to at least a trailing end portion of the recording material P with respect to the conveying direction. Further, the recording material charging member 14 may desirably be contactable to the recording material P in a substantially whole area of an image forming region with respect to a direction perpendicular to the conveying direction. Further, in this embodiment, when a trailing end of the recording material P with respect to the conveying direction passes through the transfer nip NT, the applying portions 20 and 21 apply, to the transfer member 8, voltages different from a voltage applied to the transfer member 8 when a central portion of the recording material P with respect to the conveying direction passes through the transfer nip NT. When a trailing end of the recording material P with respect to the conveying direction passes through the transfer nip NT, the applying portions 20 and 21 can apply, to the transfer member 8, voltages smaller in absolute value than a voltage which has a polarity opposite to the predetermined polarity and which is applied to the transfer member 8 when a central portion of the recording material P with respect to the conveying direction passes through the transfer nip NT. Further, when a trailing end of the recording material P with respect to the conveying direction passes through the transfer nip NT, the applying portions 20 and 21 can apply, to the transfer member 8, voltages of the same polarity as the predetermined polarity.

(8) Modified Embodiments of Embodiment 1

Next, modified embodiments of the embodiment 1 will be described.

(8-1) Contact Range

First, modified embodiments relating to a contact range of the upper transfer guide 14 with the recording material P will be described.

Left figures of parts (a) to (d) of FIG. 7 are schematic sectional views of upper transfer guides in the embodiment 1 and modified embodiments, respectively. Right figures of parts (a) to (d) of FIG. 7 are front views as viewed from arrow α directions in the associated left figures, respectively.

Part (a) of FIG. 7 shows the upper transfer guide 14 in the embodiment 1. From a viewpoint that the trailing end memory is suppressed by triboelectric charging the recording material P to the same polarity as the charge polarity of the photosensitive drum 2 by the upper transfer guide 14, the upper transfer guide 14 may desirably uniformly contact the recording material P with respect to the longitudinal direction. Further, a contact width between the upper transfer guide 14 and the recording material P with respect to the longitudinal direction may desirably be wider than at least the image forming region (i.e., it is desirable that the image forming region falls within the contact width). For that reason, as shown in part (a) of FIG. 7, it is desirable that a portion of the upper transfer guide 14 contacting the recording material P is not provided with an uneven shape and thus the upper transfer guide 14 uniformly contacts the recording material P with respect to the longitudinal direction. Further, as shown in part (a) of FIG. 7, it is desirable that the contact width with respect to the longitudinal direction is made wider than the image forming region and thus the triboelectric charge of the recording material P is performed in a sufficient range.

On the other hand, the case where it is difficult to employ a constitution as shown in part (a) of FIG. 7 due to various restrictions as described below is assumed, for example.

First, for example, for the purpose of improving an assembling property or the like, the case where the upper transfer guide 14 is divided with respect to the longitudinal direction is assumed. Or, when the upper transfer guide 14 is molded with use of a mold, for example, for the purpose of ensuring molding stability or the like, the case where a recessed groove is partially formed on the upper transfer guide 14 is assumed. In either case, for example, as shown in part (b) of FIG. 7, on the upper transfer guide 14, generation of a portion, which does not contact the recording material P, with a predetermined width ("b" in the right figure of part (b) of FIG. 7) with respect to the longitudinal direction is assumed. The case of the upper transfer guide 14 provided with the recessed groove as shown in part (b) of FIG. 7 is a modified embodiment 1 (1-1, 1-2, 1-3).

Further, for example, for the purpose of improving dimension accuracy or the like for conveyance of the recording material P, the case where a rib shape is partially provided on the upper transfer guide 14 is assumed. In this case, for example, as shown in part (c) of FIG. 7, on the upper transfer guide 14, formation of the rib projecting toward the surface of the recording material P, with a predetermined interval ("c" in the right figure of part (c) of FIG. 7) with respect to the longitudinal direction is assumed. The case of the upper transfer guide 14 provided with the recessed groove as shown in part (c) of FIG. 7 is a modified embodiment 2 (2-1, 2-2, 2-3).

Further, for example, for the purpose of reducing warpage or the like, the case where a width of the upper transfer guide 14 with respect to the longitudinal direction made narrower than the image forming region is assumed. In this case, for example, as shown in part (d) of FIG. 7, on the upper transfer guide 14, generation of a region in which the upper transfer guide 14 does not exist in a predetermined range ("d" in the right figure of part (d) of FIG. 7) with respect to the longitudinal direction within the image forming region (typically, at both end portions) is assumed. The case of the upper transfer guide 14 narrower in contact width with respect to the longitudinal direction than the image forming region as shown in part (d) of FIG. 7 is a modified embodiment 3 (3-1, 3-2, 3-3).

A table 3 shows performance evaluation results of the above-described modified embodiments 1-1 to 1-3, 2-1 to 2-3, and 3-1 to 3-3. An item of performance evaluation is the trailing end memory and an evaluation method thereof is the same as the above-described evaluation method.

TABLE 3

| MODIFIED EMBODIMENT | SHAPE OF UTG*[1] | TEM*[2] |
|---|---|---|
| 1-1 | FIG. 7(b) b = 2 mm | NO |
| 1-2 | FIG. 7(b) b = 5 mm | NO |
| 1-3 | FIG. 7(b) b = 10 mm | SO |
| 2-1 | FIG. 7(c) c = 60 mm | NO |
| 2-2 | FIG. 7(c) c = 30 mm | NO |
| 2-3 | FIG. 7(c) c = 10 mm | SO |
| 3-1 | FIG. 7(d) d = 5 mm | NO |
| 3-2 | FIG. 7(d) d = 10 mm | NO |
| 3-3 | FIG. 7(d) d = 20 mm | SO |

*[1]"UTG" is the upper transfer guide.

*[2]"TEM" is the trailing end memory. "NO" shows that the trailing end memory did not occur, and "SO" shows that the trailing end memory slightly occurred.

First, the evaluation results of the modified embodiments 1-1 to 1-3, different in width b of the recessed groove, as the modified embodiment 1 including the recess groove shape will be described. The upper transfer guide 14 in the modified embodiment 1-1 includes the recessed groove with a width of b=2 mm which is a relatively narrow width. In a constitution of the modified embodiment 1-1, the recessed groove width b is narrow, and therefore, the peeling electric discharge suppressing effect was insufficient. Or, in the constitution of the modified embodiment 1-1, even when the peeling electric discharge slightly generated, the trailing end memory was a visually unrecognizable degree.

For that reason, in the constitution of the modified embodiment 1-1, the trailing end memory did not substantially occur. In a constitution (b=5 mm) of the modified embodiment 1-2, similarly as in the modified embodiment 1-1, the trailing end memory did not substantially occur. The upper transfer guide 14 in the modified embodiment 1-3 includes the recessed groove with a width of b=10 mm which is a relatively wide width. In the constitution of the modified embodiment 1-3, the recessed groove width b is wide, and therefore, a region in which contact of the upper transfer guide 14 with the recording material P is insufficient exists, so that the trailing end memory slightly occurred. As described above, for example, in the case where the upper transfer guide 14 includes the recessed groove as shown in part (b) of FIG. 7, the recessed groove width b may desirably be 5 mm or less.

Next, the evaluation results of the modified embodiments 2-1 to 2-3, different in width c of the rib, as the modified embodiment 2 including the rib shape will be described. The upper transfer guide 14 in the modified embodiment 2-1 includes the recessed groove with an interval of c=60 mm which is a relatively wide interval. In a constitution of the modified embodiment 2-1, the rib interval c is wide, and therefore, the peeling electric discharge suppressing effect was insufficient. Or, in the constitution of the modified embodiment 2-1, even when the peeling electric discharge slightly generated, the trailing end memory was a visually unrecognizable degree.

For that reason, in the constitution of the modified embodiment 2-1, the trailing end memory did not substantially occur. In a constitution (c=30 mm) of the modified embodiment 2-2, similarly as in the modified embodiment 2-1, the trailing end memory did not substantially occur. The upper transfer guide 14 in the modified embodiment 2-3 includes the recessed groove with an interval of c=10 mm which is a relatively narrow width. In the constitution of the modified embodiment 2-3, the rib interval c is narrow, and therefore, a region in which contact of the upper transfer guide 14 with the recording material P is insufficient exists, so that the trailing end memory slightly occurred. As described above, for example, in the case where the upper transfer guide 14 includes the rib as shown in part (c) of FIG. 7, the rib interval c may desirably be 30 mm or more.

Further, the evaluation results of the modified embodiments 3-1 to 3-3, different in width d of the region in which the upper transfer guide 14 does not exist at both end portions of the image forming region, as the modified embodiment 3 in which the contact width with respect to the longitudinal direction is narrower than the image forming region will be described. The upper transfer guide 14 in the modified embodiment 3-1 includes the region in which the upper transfer guide 14 does not exist at both end portions of the image forming region with respect to the longitudinal direction in a range of d=5 mm which is a relatively narrow range. In a constitution of the modified embodiment 3-1, the region in which the upper transfer guide 14 does not exist is narrow, and therefore, the peeling electric discharge suppressing effect was insufficient. Or, in the constitution of the modified embodiment 3-1, even when the peeling electric discharge slightly generated, the trailing end memory was a visually unrecognizable degree.

For that reason, in the constitution of the modified embodiment 3-1, the trailing end memory did not substantially occur. In a constitution (d=10 mm) of the modified embodiment 3-2, similarly as in the modified embodiment 3-1, the trailing end memory did not substantially occur. The upper transfer guide 14 in the modified embodiment 3-3 includes the region in which the upper transfer guide 14 does not exist at both end portions of the image forming region with respect to the longitudinal direction in a range of d=20 mm which is a relatively wide range. In the constitution of the modified embodiment 3-3, the region in which the upper transfer guide 14 does not exist is wide, and therefore, a region in which contact of the upper transfer guide 14 with the recording material P is insufficient widely exists, so that the trailing end memory slightly occurred particularly in a region of end portions with respect to the longitudinal direction. As described above, for example, in the case where the contact width with respect to the longitudinal direction is narrower than the image forming region as shown in part (d) of FIG. 7, the width d of the region in which the upper transfer guide 14 does not exist in the image forming region may desirably be 10 mm or less.

Incidentally, the constitution of the modified embodiments were described using specific numerical values, but the present invention is not limited to those described in the above-described modified embodiments. The recording material charging member may only be desirably required that the recording material charging member contacts an almost whole area of the recording material P with respect to the longitudinal direction and performs the triboelectric charge, and thus can suppress the trailing end memory. For that reason, also, in a range other than the above-described numerical ranges in the above-described modified embodiments, when the trailing end memory can be suppressed within an allowable range, a constitution in which a shape and a dimension of the recording material charging member are changed can be employed.

(8-2) Retraction Constitution

Next, modified embodiments relating to a retraction constitution of the upper transfer guide 14 will be described.

As described above, in the embodiment 1, the guide rotation shaft 14*a* is disposed at an end portion of the upper transfer guide 14 on an upstream side (the registration nip NR side), and the free end portion 14*b* of the upper transfer guide 14 on a downstream side (the transfer nip NT side) is rotated and retracted. However, for example, from viewpoints of arrangements of various members and smooth conveyance of the recording material P, the case where it is difficult to dispose the guide rotation shaft 14*a* in a position as in the embodiment 1 is assumed. In such a case, a constitution as described below may be employed. Left figures of parts (a) and (b) of FIG. 8 are schematic sectional views each showing another modified embodiment of the upper transfer guide 14. Further, a right figure of part (a) of FIG. 8 is a front view as viewed from an arrow a direction in the left figure of part (a) of FIG. 8, and a right figure of part (b) of FIG. 8 is a plan view as viewed from an arrow β direction in the left figure of part (b) of FIG. 8.

For example, as shown in part (a) of FIG. 8, it is also possible to provide the guide rotation shaft 14*a* at the end portion of the upper transfer guide 14 on the downstream side (the transfer nip NT side). In this case, the end portion of the upper transfer guide 14 on the upstream side (the registration nip NR side) contacts the recording material P, so that this end portion is rotated and retracted. Incidentally, the guide rotation shaft 14*a* may be provided in a position between the upstream end portion and the downstream end portion of the upper transfer guide 14.

Further, movement of the upper transfer guide 14 is not limited to the rotation, but as shown in part (b) of FIG. 8, the upper transfer guide 14 may also be slid (slide movement). In a constitution shown in part (b) of FIG. 8, the image forming apparatus 1 is provided with a guide retraction groove 14*e* for supporting and guiding the upper transfer guide 14 slidably and movably. Further, in this constitution, the upper transfer guide 14 is provided with an engaging portion 14*f* loosely engaged with the guide retraction groove 14*e*. In an example illustrated, in four corners of the upper transfer guide 14, i.e., at each of opposite end portions of the upper transfer guide 14 with respect to the longitudinal direction in the upstream end portion and at opposite end portions of the upper transfer guide 14 with respect to the longitudinal direction in the downstream end portion, two engaging portions 14*f* are provided. Further, in this constitution, the upper transfer guide 14 is pressed by a pressing spring (not shown) toward a lower portion in the figure so as to contact the recording material P. Further, when the upper transfer guide 14 receives reaction force from the recording material P, the upper transfer guide 14 is capable of being slid and retracted toward an upper portion in the figure along the guide retraction grooves 14*e*. Also, by such a constitution, the free end portion 14*b* which is the contact portion of the upper transfer guide 14 with the recording material P can be made movable in a direction crossing a surface of the recording material P (surface of the recording material P conveyed from the registration nip NR toward the transfer nip NT) in a position where the recording material P opposes the upper transfer guide 14.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, as regards elements having the same or corresponding functions or constitutions as those of the image forming apparatus of the embodiment 1, detailed description will be omitted by adding thereto the same reference numerals or symbols as those in the embodiment 1.

In the embodiment 1, the constitution in which the upper transfer guide 14 was made movable by being rotated, in the direction in which the free end portion 14*b* which is the contact portion of the upper transfer guide 14 with the recording material P crosses the surface of the recording material P in the position where the recording material P opposes the upper transfer guide 14 was employed. On the other hand, in this embodiment, an upper transfer guide is constituted by a deformable sheet-like member. Further, in this embodiment, a constitution in which the upper transfer guide is made movable, by being deformed, in a free end portion which is a contact portion of the upper transfer guide with the recording material P crosses the surface of the recording material P in a position where the recording material P opposes the upper transfer guide is employed.

FIG. 9 is a schematic sectional view (sectional view showing a cross section substantially perpendicular to the rotational axis direction of the photosensitive drum 2) in the neighborhood of the transfer nip NT in this embodiment. In this embodiment, the image forming apparatus 1 includes a sheet-like upper transfer guide 30. This upper transfer guide 30 has a predetermined length in each of a longitudinal direction extending substantially in parallel to the rotational axis direction of the photosensitive drum 2 and a widthwise (short-side) direction substantially perpendicular to the longitudinal direction, and has a predetermined thickness. In this embodiment, the upper transfer guide 30 is constituted by a thin film (sheet) formed of a resin material. Further, in this embodiment, a material of the upper transfer guide is PC, and a thickness of the upper transfer guide 30 is 350 μm. Further, in this embodiment, the upper transfer guide 30 contacts the recording material P at a free end portion 30*b* thereof on a downstream side (on the transfer nip NT side). In a state in which the upper transfer guide 30 is not deformed, the free end portion 30*b* on the downstream side is disposed to enter a rectilinear line L1, toward a lower side (the transfer roller 8 side), passing through the registration nip NR and the transfer nip NT in the cross section shown in FIG. 9. In this embodiment, the sheet-like upper transfer guide 30 functions as the recording material charging member (recording material charging means). That is, in this embodiment, similarly as the upper transfer guide 14 in the embodiment 1, the sheet-like upper transfer guide 30 has a function of triboelectrically charging the recording material P to the same polarity as the charge polarity of the photosensitive drum 2.

Further, the upper transfer guide 30 is held (supported) by a guide holding member 30*a*.

In this embodiment, the upper transfer guide 30 is stuck and fixed to the guide holding member 30*a* on an upstream end portion side thereof so that a downstream portion side thereof projects from the guide holding member 30*a* by about 15 mm. By this, the free end portion 30*b* of the upper transfer guide 30 on the downstream side (the transfer nip NT side) is made movable toward the upper portion in FIG. 9 by deformation. A force required for the deformation can be adjusted by adjusting a thickness of a sheet constituting the upper transfer guide 30 and a projection amount of the upper transfer guide 30 from the guide holding member. In this embodiment, similarly as in the embodiment 1, in the case where a force of 0.59N acts on the free end portion 30*b* of the upper transfer guide 30, a setting is made so that the free end of the upper transfer guide 30 is deformed upward in the FIG. 9.

As described above, in this embodiment, by the upper transfer guide 30, the recording material P can be triboelectrically charged to the same polarity as the charge polarity of the photosensitive drum 2. By this, the trailing end memory can be suppressed by reducing the peeling electric charge when the recording material P passes through the transfer nip NT. Further, in this embodiment, for example, in the case where the thick paper or the like is conveyed as the recording material P, the upper transfer guide 30 is deformed and retracted. By this, excessive charging of the upper transfer guide 30 is suppressed, so that the black spot image can be suppressed. That is, the effect achieved by the rotation of the upper transfer guide 14 in the embodiment 1 can be achieved by deformation of the upper transfer guide 30 in this embodiment.

A table 4 shows a performance evaluation result of the upper transfer guide 30 of this embodiment. Items of performance evaluation are the trailing end memory and the black spot image, and evaluation methods of these items are the same as the evaluation methods described in the embodiment 1.

TABLE 4

| | UTGSM*[1] | TEM*[2] | BSI*[3] |
|---|---|---|---|
| EMB. 2 | SLPC | NOT OCCURRED | NOT OCCURRED |
| EMB. 1 | PLPC | NOT OCCURRED | NOT OCCURRED |

*[1]"UTGSM" is upper transfer guide shape and material. "SLPC" is a sheet-like PC resin, and "PLPC" is a plate-like PC resin.
*[2]"TEM" is the trailing end memory.
*[3]"BSI" is the black spot image.

Also, in this embodiment, the recording material P was triboelectrically charged by the upper transfer guide 30 similarly as in the embodiment 1, and therefore, the trailing end memory did not occur. Further, in the constitution of this embodiment, in the case where the thick paper is conveyed, the free end portion of the upper transfer guide 30 can be deformed and retracted, and therefore, similarly as in the embodiment 1, the excessive charging of the upper transfer guide 30 was suppressed, so that the black spot image also did not occur.

Further, in this embodiment, the material of the upper transfer guide 30 is PC, but is not limited thereto. As described in the embodiment 1, when the material is a material capable of triboelectrically charging the recording material P to a predetermined polarity, the material can be appropriately used.

Further, as regards the shape of the upper transfer guide 30, as described as the modified embodiments of the embodiment 1, the upper transfer guide 30 may only be desirably required that the trailing end memory can be suppressed by performing the predetermined triboelectric charge in contact with the substantially whole area of the recording material P with respect to the longitudinal direction. For that reason, when the trailing end memory can be suppressed to within the allowable range, the shape of the upper transfer guide 30 can be appropriately changed.

For example, as described as the modified embodiments of the embodiment 1, the constitution in which the groove shape is provided (the upper transfer guide is divided with respect to the longitudinal direction), the constitution in which the rib shape is provided, the constitution in which the width of the upper transfer guide with respect to the longitudinal direction is shortened and thus the region in which the upper transfer guide 30 does not exist at the end portions of the image forming region, and the like constitution may be employed. Further, in this embodiment, similarly as the embodiment 1, the contact portion 14*b* of the recording material charging member 14 is moved by a force received from the recording material P. Particularly, in this embodiment, the contact portion 14*b* of the recording material charging member 14 is moved by deformation of the recording material charging member 14. Further, in this embodiment, the recording material P has a first kind and a second kind larger in basis weight than the recording material of the first kind, and the recording material charging member is configured so as to be capable of being positioned on a more downstream side of a direction in which the contact portion 14*b* thereof is moved from the side of the surface opposite from the image forming surface of the recording material P toward the side of the image forming surface in a case that the recording material P of the second kind is conveyed toward the transfer nip NT than in a case that the recording material P of the first kind is conveyed toward the transfer nip NT.

In the above, the present invention was described in accordance with specific embodiments, but the present invention is not limited to the above-described embodiments.

In the above-described embodiments, the guiding member for guiding the recording material had the function of the recording material charging member, but the image forming apparatus may also include a recording material charging member separate from the guiding member. FIG. 10 is a schematic sectional view in the neighborhood of a transfer nip in an image forming apparatus including the recording material charging member separate from the guiding member. Incidentally, in FIG. 10, elements having the same or corresponding functions to those of the above-described embodiments are represented by the same reference numerals or symbols as those in the embodiment 1. An image forming apparatus 1 shown in FIG. 10 includes a recording material charging member 31 contacting the image forming surface of the recording material P on a side downstream of the upper transfer guide 14 and upstream of the lower transfer guide 15. The recording material charging member 31 contacts the recording material P at a contact portion 31*b* constituted by a surface thereof opposing the recording material P. Further, the recording material charging member 31 is pressed downward in the figure by a pressing spring 31*a* so as to contact the recording material P. In such a constitution, an effect similar to the effects of the above-described embodiments can be obtained.

Incidentally, in the image forming apparatus 1 shown in FIG. 10, the upper transfer guide 14 may be fixedly disposed similarly as the upper transfer guide 14 shown in part (b) of FIG. 6.

Further, in the above-described embodiments, for example, in the case where a recording material high in rigidity such as the thick paper is conveyed, the recording material charging member is retracted in a state in which the recording material charging member contacts the recording material, so that it was disposed that the recording material charging member and the recording material strongly rub with each other under an excessive load. On the other hand, for example, in the case where the recording material high in rigidity such as the thick paper is conveyed, the recording material charging member may be prevented from contacting the recording material. FIG. 11 is a schematic view of a principal portion of the image forming apparatus capable of moving the recording material charging member so as not to contact the recording material.

Incidentally, in FIG. 11, elements having the same or corresponding functions to those in the above-described embodiments or in FIG. 10 are represented by the same reference numerals or symbols as those in the embodiment 1. The image forming apparatus 1 shown in FIG. 11 includes the recording material charging member 31 and the pressing spring 31*a* similar to those in FIG. 10. Further, the image forming apparatus 1 shown in FIG. 11 includes a moving mechanism 40 capable of moving the recording material charging member 31 upward (in a direction separated from a conveying locus of the recording material P) in the figure against an urging force of the pressing spring 31*a*. The moving mechanism 40 includes a rotatable cam 41 contacting a receiving portion 31*c* provided at each of opposite end portions of the recording material charging member 31 with respect to the longitudinal direction, and a driving portion 42 for rotationally driving the cam 41. The driving portion 42 is constituted by including a motor as a driving source, a drive transmission member, and the like. A controller 120 controls the driving portion 42, so that the driving portion 42 is capable of disposing the recording material charging member 31 in a first position (contact position) where the recording material charging member 31 is contactable to the recording material P and a second position (spaced position) where the recording material charging member 31 does not contact the recording material P. By the cam 41, the recording material charging member 31 is pressed upward in FIG. 11 against the urging force of the pressing spring 31*a*, so that the recording material charging member 31 can be moved from the first position to the second position. Further, the pressing by the cam 41 is released, so that movement of the recording material charging member 31 from the second position to the first position can be permitted by a self-weight thereof and the pressing force of the pressing spring 31*a*.

For example, in the case where the recording material P of a predetermined kind is conveyed, on the basis of information on the kind of the recording material P included in a print instruction inputted from an external device, the controller 120 is capable of controlling the recording material charging member so as to be disposed in the second position where the recording material charging member does not contact the recording material P. For example, the recording material charging member 31 can be disposed in the second position in the case where a recording sheet having a basis weight of not less than a predetermined threshold set in advance. By this, for example, in the case where the recording material P high in rigidity such as the thick paper is conveyed, the recording material P can be prevented from being triboelectrically charged by the recording material charging member 31. Incidentally, for example, in the case where the thick paper is used as the recording material P, for the purpose of improving a fixing property or the like, a conveying speed of the recording material P is made lower than that in the case where the plain paper is used as the recording material P in some instances. In the case where the conveying speed of the recording material P is low, due to that the transfer voltage can be made weaker than in the case where the conveying speed of the recording material P is high, peeling electric discharge when the recording material P passes through the transfer nip NT does not readily occur in some instances. In such a case, as described above, for example, in the case where the thick paper is used as the recording material P, even when the triboelectric charge of the recording material P by the recording material charging member 31 is not performed, a problem of the trailing end memory does not readily occur. Thus, the image forming apparatus 1 may include the moving mechanism 40 capable of moving the recording material charging member 31 to a first position where the contact portion 31*b* is contactable to the recording material P and a second position where the contact portion 31*b* does not contact the recording material P. Further, the moving mechanism 40 is capable of disposing the recording material charging member 31 in the first position in the case where the recording material P of a first kind is conveyed toward the transfer nip NT and is capable of disposing the recording material charging member 31 in the second position in the case where the recording material P of a second kind larger in basis weight than the recording material P of the first kind.

Further, in the embodiment 1 and other embodiments, the constitution in which the recording material charging member is urged by the pressing spring in a direction in which the recording material charging member contacts the recording material was described, but depending on a constitution (such as a weight) of the recording material charging member, a constitution in which the recording material charging member is urged only by gravitation (self-weight) may also be employed.

Further, the image bearing member is not limited to a drum-shaped image bearing member, but may also be an endless belt-shaped image bearing member.

Further, the transfer member is not limited to a roller-shaped transfer member, but may also be those having a brush shape, a blade shape, a pad shape, a film shape, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-079732 filed on May 12, 2023, which is hereby incorporated by reference herein in its entirety.

What is claimed is:

1. An image forming apparatus comprising:

a rotatable image bearing member;

a charging member configured to electrically charge a surface of the image bearing member to a predetermined polarity;

a developing member configured to form a toner image on the surface of the image bearing member by supplying toner, charged to the same polarity as the predetermined polarity, to the surface of the image bearing member charged by the charging member;

a transfer member configured to form a transfer nip in contact with the surface of the image bearing member and configured to transfer the toner image from the image bearing member onto a recording material passing through the transfer nip under application of a transfer voltage;

an applying portion configured to apply, to the transfer member, the transfer voltage of a polarity opposite to the predetermined polarity;

a recording material charging member provided on a side upstream of the transfer nip with respect to a conveying direction of the recording material nipped and conveyed through the transfer nip and capable of contacting an image forming surface which is a surface of the recording material, onto which the toner image is transferred, conveyed toward the transfer nip, and capable of charging the image forming surface to the same polarity as the predetermined polarity by triboelectric charge;

an urging portion configured to urge the recording material charging member in a direction in which the contact portion of the recording material charging member is moved from an image forming surface side toward a surface side opposite from the image forming surface side, wherein a contact portion of the recording material charging member with the recording material is moved in a direction crossing the surface of the recording material at a position where the recording material opposes the recording material charging member by a force received from the recording material, wherein the recording material is of a first kind and a second kind greater in basis weight than the recording material of the first kind, and wherein the urging portion is configured so as to be capable of being positioned on a more downstream side in a direction in which the contact portion of the recording material charging member is moved from the surface side opposite from the image forming surface side toward the image forming surface side in a case that the recording material of the second kind is conveyed toward the transfer nip than in a case that the recording material of the first kind is conveyed toward the transfer nip.

2. The image forming apparatus according to claim 1, wherein with respect to the conveying direction, the recording material charging member is disposed on a side downstream of a conveying member for conveying the recording material at a closest position to the transfer nip on the side upstream of the transfer nip.

3. The image forming apparatus according to claim 1, wherein the recording material charging member has a function of guiding the recording material conveyed toward the transfer nip.

4. The image forming apparatus according to claim 1, wherein the image forming surface of the recording material contacts the surface of the image bearing member subsequently to the recording material charging member.

5. The image forming apparatus according to claim 1, wherein the contact portion of the recording material charging member is moved by deformation of the recording material charging member.

6. The image forming apparatus according to claim 5, wherein the recording material charging member is configured so as to be capable of being positioned on a more downstream side in a direction in which the contact portion is moved from a surface side opposite from the image forming surface side toward the image forming surface side in a case that the recording material of the second kind is conveyed toward the transfer nip than in a case that the recording material of the first kind is conveyed toward the transfer nip.

7. The image forming apparatus according to claim 1, further comprising a moving mechanism capable of moving the recording material charging member to a first position where the contact portion is contactable to the recording material and a second position where the contact portion does not contact the recording material.

8. The image forming apparatus according to claim 7, wherein the moving mechanism moves the recording material charging member to the first position in a case that the recording material of the first kind is conveyed to the transfer nip, and moves the recording material charging member to the second position in a case that the recording material of the second kind is conveyed to the transfer nip.

9. The image forming apparatus according to claim 1, wherein the recording material charging member is contactable to at least a trailing end portion of the recording material with respect to the conveying direction.

10. The image forming apparatus according to claim 1, wherein the recording material charging member is contactable to the recording material in a substantially whole area of an image forming region with respect to a direction perpendicular to the conveying direction.

11. The image forming apparatus according to claim 1, wherein when a trailing end of the recording material with respect to the conveying direction passes through the transfer nip, the applying portion applies, to the transfer member, a voltage different from a voltage applied to the transfer member when a central portion of the recording material with respect to the conveying direction passes through the transfer nip.

12. The image forming apparatus according to claim 11, wherein when the trailing end of the recording material with respect to the conveying direction passes through the transfer nip, the applying portion applies, to the transfer member, the voltage lower in absolute value than the voltage which has a polarity opposite to the predetermined polarity and which is applied to the transfer member when the central portion of the recording material with respect to the conveying direction passes through the transfer nip.

13. The image forming apparatus according to claim 11, wherein when the trailing end of the recording material with respect to the conveying direction passes through the transfer nip, the applying portion applies, to the transfer member, the voltage of the same polarity as the predetermined polarity.

* * * * *